(12) United States Patent
Shin et al.

(10) Patent No.: US 10,365,882 B2
(45) Date of Patent: Jul. 30, 2019

(54) DATA PROCESSING METHOD AND ELECTRONIC DEVICE THEREOF

(71) Applicant: Samsung Electronics Co., Ltd., Suwon-si, Gyeonggi-do (KR)

(72) Inventors: Hyun-Seok Shin, Seongnam-si (KR); Chang-Ryong Heo, Suwon-si (KR); Dong-Il Son, Hwaseong-si (KR); Yong-Sang Yun, Suwon-si (KR); Chi-Hyun Cho, Suwon-si (KR); Jong-Chul Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 165 days.

(21) Appl. No.: 14/724,087

(22) Filed: May 28, 2015

(65) Prior Publication Data
US 2015/0347080 A1 Dec. 3, 2015

(30) Foreign Application Priority Data
May 30, 2014 (KR) .................. 10-2014-0066386

(51) Int. Cl.
*G06F 3/16* (2006.01)
*G06F 3/01* (2006.01)
(Continued)

(52) U.S. Cl.
CPC .............. *G06F 3/16* (2013.01); *G06F 3/012* (2013.01); *G06F 3/013* (2013.01); *G06F 3/016* (2013.01);
(Continued)

(58) Field of Classification Search
CPC ........ G06F 3/16; G06F 3/017; G06F 3/04845; G06F 3/012; G06F 3/013; G06F 3/016; G06F 3/147; G06F 3/0416; G06F 1/163; G06F 1/1694; G06F 3/0485; G06F 2203/04806; G06F 3/04883;
(Continued)

(56) References Cited

U.S. PATENT DOCUMENTS

| 8,427,396 B1 | 4/2013 | Kim |
| 9,454,898 B2 * | 9/2016 | Kim ...................... G08C 17/02 |

(Continued)

FOREIGN PATENT DOCUMENTS

| CN | 101449265 A | 6/2009 |
| CN | 103018905 A | 4/2013 |

(Continued)

OTHER PUBLICATIONS

Chinese Office Action dated Sep. 20, 2018; Application #: 201580028946.1; Issuing No. 2018091701660960.
(Continued)

*Primary Examiner* — Chineyere D Wills-Burns
(74) *Attorney, Agent, or Firm* — Jefferson IP Law, LLP

(57) ABSTRACT

A method of operating an electronic device is provided. The method includes making a connection to another electronic device and switching to a particular mode, transmitting information on a request for switching to the particular mode to one or more wearable devices, receiving detection information from the wearable devices, and performing a function of the electronic device corresponding to the detection information.

14 Claims, 21 Drawing Sheets

(51) Int. Cl.
| | |
|---|---|
| *G09G 3/00* | (2006.01) |
| *G06F 3/147* | (2006.01) |
| *G06F 3/041* | (2006.01) |
| *G06K 9/00* | (2006.01) |
| *G06F 3/0484* | (2013.01) |
| *G06F 1/16* | (2006.01) |
| *G06F 3/0485* | (2013.01) |
| *G06F 3/0488* | (2013.01) |

(52) U.S. Cl.
CPC ............ *G06F 3/017* (2013.01); *G06F 3/0416* (2013.01); *G06F 3/04845* (2013.01); *G06F 3/147* (2013.01); *G06K 9/00375* (2013.01); *G09G 3/001* (2013.01); *G09G 3/003* (2013.01); *G06F 1/163* (2013.01); *G06F 1/1694* (2013.01); *G06F 3/0485* (2013.01); *G06F 3/04883* (2013.01); *G06F 2203/04806* (2013.01); *G06F 2203/04808* (2013.01); *G09G 2370/12* (2013.01); *G09G 2380/02* (2013.01)

(58) Field of Classification Search
CPC .......... G06F 2203/04808; G09G 3/001; G09G 3/003; G09G 2370/12; G09G 2380/00; G09G 2380/02; G06K 9/00375
USPC .......................................... 345/173
See application file for complete search history.

(56) References Cited

U.S. PATENT DOCUMENTS

| | | | |
|---|---|---|---|
| 2003/0043114 A1* | 3/2003 | Silfverberg ........... | G06F 1/1626 345/157 |
| 2006/0066582 A1 | 3/2006 | Lyon et al. | |
| 2009/0040187 A1* | 2/2009 | Ko ....................... | G06F 3/0416 345/173 |
| 2009/0128448 A1* | 5/2009 | Riechel .................. | G06F 1/163 345/8 |
| 2010/0079356 A1* | 4/2010 | Hoellwarth .......... | G02B 27/017 345/8 |
| 2010/0220062 A1* | 9/2010 | Antila .................. | G06F 3/0488 345/173 |
| 2011/0124376 A1* | 5/2011 | Kim ...................... | G06F 1/1626 455/566 |
| 2012/0068914 A1 | 3/2012 | Jacobsen et al. | |
| 2012/0075168 A1* | 3/2012 | Osterhout ............ | G02B 27/017 345/8 |
| 2012/0206443 A1 | 8/2012 | Kimura et al. | |
| 2014/0125579 A1* | 5/2014 | Yamamoto ........... | G02B 27/017 345/156 |
| 2014/0285520 A1* | 9/2014 | Park ...................... | G06T 19/006 345/633 |
| 2014/0374610 A1* | 12/2014 | Nishino ................... | H04N 5/32 250/370.09 |
| 2015/0160731 A1* | 6/2015 | Yun ........................ | G06F 3/017 715/740 |
| 2015/0208141 A1* | 7/2015 | Kim ....................... | G08C 17/02 340/870.07 |
| 2016/0057268 A1* | 2/2016 | Jiang ....................... | H04B 5/00 455/556.1 |

FOREIGN PATENT DOCUMENTS

| | | |
|---|---|---|
| CN | 103763608 A | 4/2014 |
| CN | 103809687 A | 5/2014 |
| GB | 2499102 A | 8/2013 |

OTHER PUBLICATIONS

European Office Action dated Jun. 12, 2019, issued in European Patent Application No. 15798739.7.

* cited by examiner

DATA PROCESSING METHOD AND ELECTRONIC DEVICE THEREOF

CROSS-REFERENCE TO RELATED APPLICATION(S)

This application claims the benefit under 35 U.S.C. § 119(a) of a Korean patent application filed on May 30, 2014 in the Korean Intellectual Property Office and assigned Serial No. 10-2014-0066386, the entire disclosure of which is hereby incorporated by reference.

TECHNICAL FIELD

The present disclosure relates to a method of processing data received by an electronic device and an electronic device thereof.

BACKGROUND

Wearable devices (for example, smart watches or smart bands) which are connected to electronic devices (for example, smart phones) through short-range communication have appeared, and new User Experiences (UXs) such as various notification services, call services, email/Social Networking Service (SNS) checking functions, exercise quantity measuring services and the like have been provided through the wearable devices.

The electronic device may be used as a device that provides a source of an image displayed through a head-mounted electronic device (for example, a Head Mounted Display (HMD)). The head-mounted electronic device may be mounted on a user's head to display a large screen in front of user's eyes (for example, user's sight) or output a Three-Dimensional (3D) image.

The above information is presented as background information only to assist with an understanding of the present disclosure. No determination has been made, and no assertion is made, as to whether any of the above might be applicable as prior art with regard to the present disclosure.

SUMMARY

When a mode (for example, a Head Mounted Theater (HMT) mode, a virtual reality mode, or an augmented reality mode) which provides a large virtual space through a screen of an electronic device placed in front of user's eyes is used, the electronic device may be mounted on a frame for HMT and a basic input function (for example, a touch, motion sensing input, or microphone input) may be limited. Further, since the user exists in a see-closed environment where only an image output from the electronic device can be seen, the user cannot view a wearable device (for example, a smart watch or smart band), so that information and input functions shown by the wearable device are not required.

Aspects of the present disclosure are to address at least the above-mentioned problems and/or disadvantages and to provide at least the advantages described below. Accordingly, an aspect of the present disclosure is to provide a solution to limitations on inputs of the electronic device using the wearable device in the HMT mode. Further, since the wearable device does not perform an unnecessary operation (for example, display on) for a user input in the HMT mode, current consumption can be reduced.

In accordance with an aspect of the present disclosure, a method of operating an electronic device is provided. The method includes making a connection to another electronic device and switching to a particular mode, transmitting information on a request for switching to the particular mode to one or more wearable devices, receiving detection information from the wearable devices, and performing a function of the electronic device corresponding to the detection information.

In accordance with another aspect of the present disclosure, an electronic device is provided. The electronic device includes a communication interface configured to communicate with a wearable device and one or more processors configured to make a connection with another electronic device and switch to a particular mode, make a control to transmit information on a request for switching to the particular mode to one or more wearable devices, make a control to receive detection information from the wearable devices, and perform a function of the electronic device corresponding to the detection information.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
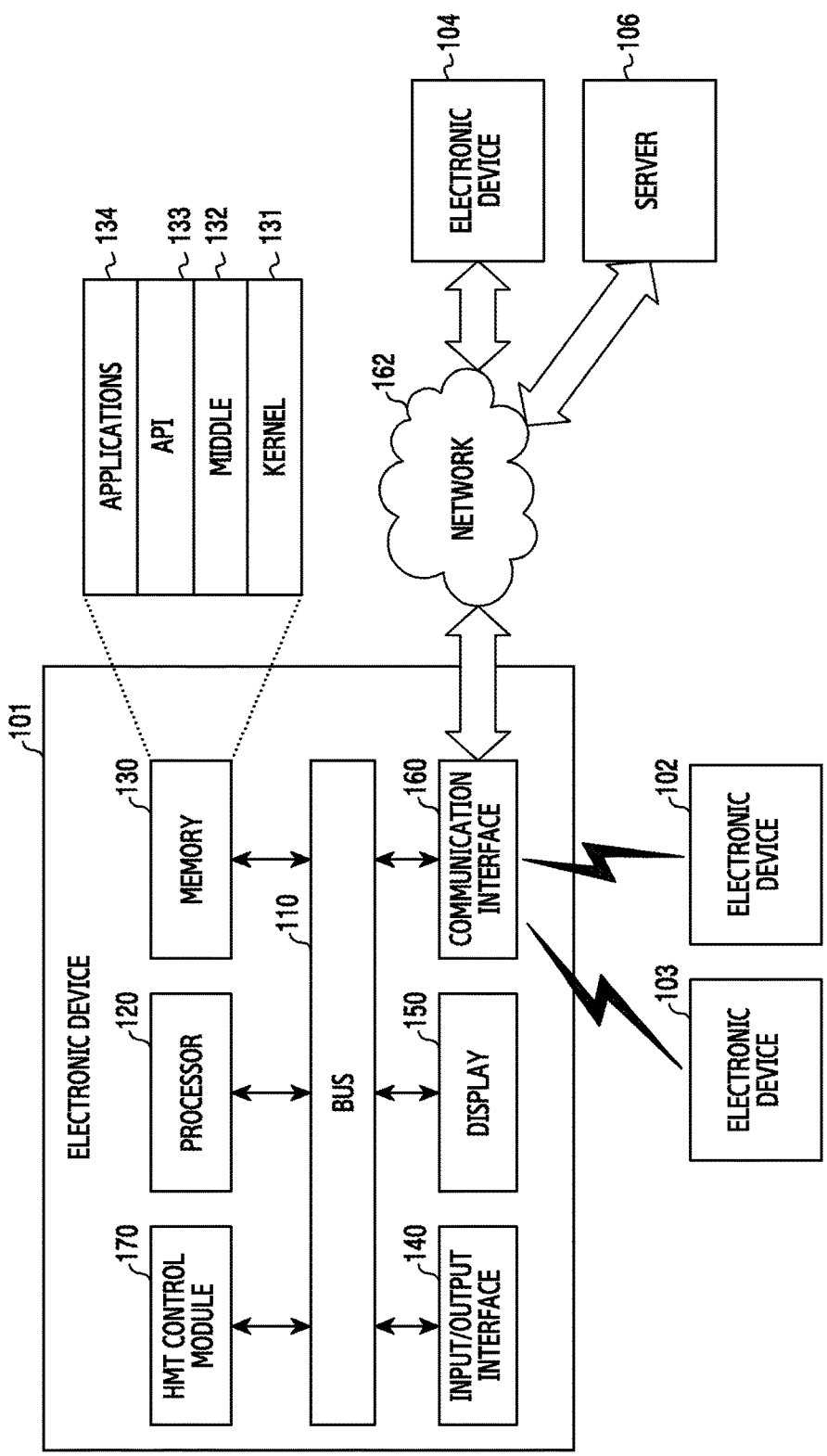
FIG. 1 illustrates a network environment including an electronic device according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

As used in various embodiments of the present disclosure, the expressions "include", "may include" and other conjugates refer to the existence of a corresponding disclosed function, operation, or constituent element, and do not limit one or more additional functions, operations, or constituent elements. Further, as used in various embodiments of the present disclosure, the terms "include", "have" and their conjugates may be construed to denote a certain characteristic, number, operation, constituent element, component or a combination thereof, but may not be construed to exclude the existence of or a possibility of addition of one or more other characteristics, numbers, operations, constituent elements, components or combinations thereof.

Further, as used in various embodiments of the present disclosure, the expression "or" includes any or all combinations of words enumerated together. For example, the expression "A or B" may include A, may include B, or may include both A and B.

As used in various embodiments of the present disclosure, the expressions "first", "second", and the like may modify various elements in the present disclosure, but do not limit the sequence and/or importance of corresponding elements. The above expressions may be used merely for the purpose of distinguishing one element from the other elements.

When an element is referred to as being "coupled" or "connected" to any other element, it should be understood that not only the element may be coupled or connected directly to the other element, but also a third element may be interposed therebetween. Contrarily, when an element is referred to as being "directly coupled" or "directly connected" to any other element, it should be understood that no element is interposed therebetween.

The terms as used in various embodiments of the present disclosure are merely for the purpose of describing particular embodiments and are not intended to limit the present disclosure. Further, all the terms used herein, including technical terms and scientific terms, should be interpreted to have the same meanings as commonly understood by those skilled in the art to which the present disclosure pertains, and should not be interpreted to have ideal or excessively formal meanings unless explicitly defined in various embodiments of the present disclosure.

An electronic device according to various embodiments of the present disclosure may be a device including a communication function. The electronic device according to various embodiments of the present disclosure may, for example, include at least one of a smart phone, a tablet personal computer (PC), a mobile phone, a video phone, an e-book reader, a desktop PC, a laptop PC, a netbook computer, a personal digital assistant (PDA), a portable multimedia player (PMP), an MP3 player, a mobile medical device, a camera, a wearable device (e.g., a head-mounted-display (HMD) such as electronic glasses, electronic clothing, an electronic bracelet, an electronic necklace, an electronic appcessory, an electronic tattoo, or a smart watch), a television (TV), a digital video disc (DVD) player, an audio, a refrigerator, an air conditioner, a vacuum cleaner, an oven, a microwave oven, a washing machine, an air cleaner, a set-top box, a TV box (e.g., Samsung HomeSync™, Apple TV™, or Google TV™), a game console, an artificial intelligence robot, an electronic dictionary, an electronic key, a camcorder, medical equipment (e.g., a magnetic resonance angiography (MRA) machine, a magnetic resonance imaging (MRI) machine, a computed tomography (CT) scanner, or an ultrasonic machine), a navigation device, a global positioning system (GPS) receiver, an event data recorder (EDR), a flight data recorder (FDR), a vehicle infotainment device, electronic equipment for a ship (e.g., ship navigation equipment and a gyrocompass), avionics, security equipment, an industrial or home robot, a part of furniture or building/structure, an electronic board, an electronic signature receiving device, a projector, and various measuring instruments (e.g., a water meter, an electricity meter, a gas meter, or a wave meter), each of which includes a communication function. The electronic device according to various embodiments of the present disclosure may be a combination of one or more of the aforementioned various devices. Further, it will be apparent to those skilled in the art that the electronic device according to various embodiments of the present disclosure is not limited to the aforementioned devices.

Hereinafter, an electronic device according to the various embodiments of the present disclosure will be described with reference to the accompanying drawings. In various embodiments of the present disclosure, the term "user" may indicate a person using an electronic device or a device (e.g. an artificial intelligence electronic device) using an electronic device.

FIG. 1 illustrates a network environment including an electronic device according to various embodiments of the present disclosure.

Referring to FIG. 1, the electronic device 101 may include at least one of a bus 110, a processor 120, a memory 130, an input/output interface 140, a display 150, a communication interface 160, and a Head Mounted Theater (HMT) control module 170.

The bus 110 may be a circuit for connecting the aforementioned components and transmitting communication (for example, a control message) between the aforementioned components.

The processor 120 may receive commands from other components (for example, the memory 130, the input/output interface 140, the display 150, the communication interface 160, and the HMT control module 170) through the bus 110, may analyze the received commands, and may execute calculations or data processing according to the analyzed commands.

The memory 130 may store commands or data received from the processor 120 or other components (for example, the input/output interface 140, the display 150, the communication interface 160, or HMT control module 170) or may store commands or data generated by the processor 120 or other components. The memory 130 may include programming modules, for example, a kernel 131, middleware 132, an Application Programming Interface (API) 133, applications 134, or the like. Each of the programming modules may be formed of software, firmware, or hardware, or a combination of two or more thereof.

The kernel 131 may control or manage the remaining programming modules, for example, system resources (for example, the bus 110, the processor 120, or the memory 130) used for executing operations or functions implemented in the middleware 132, the API 133, or the applications 134. Also, the kernel 131 may provide an interface by which the middleware 132, the API 133, or the applications 134 access the individual component of the electronic device 101 to control or manage the component.

The middleware 132 may perform a relay function which allows the API 133 or the applications 134 to communicate with and exchange data with the kernel 131. Furthermore, with regard to task requests received from the applications 134, the middleware 132 may perform a control (for example, scheduling or load balancing) for the task requests using, for example, a method of assigning a priority by which the system resources (for example, the bus 110, the processor 120, or the memory 130) of the electronic device 101 may be used for at least one of the applications 134.

The API 133 is an interface used by the applications 134 to control a function provided from the kernel 131 or the middleware 132, and may include, for example, at least one interface or function (for example, an instruction) for a file control, a window control, image processing, a character control, or the like.

The applications 134 may include an application related to an information exchange between the electronic device 101 and an external electronic device (for example, an electronic device 102, an electronic device 103, or an electronic device 104). The application related to the information exchange may include, for example, a notification transmission application for transferring predetermined information to an external electronic device or a device management application for managing an external electronic device. According to various embodiments of the present disclosure, the applications 134 may include an application designated according to attributes (for example, the type of electronic device) of the external electronic device (for example, the electronic device 102, the electronic device 103, or the electronic device 104).

The input/output interface 140 may transfer a command or data input by a user through a sensor (for example, an acceleration sensor or a gyro sensor) or an input device (for example, a keyboard or a touch screen) to the processor 120, the memory 130, the communication interface 160, or the HMT control module 170 through, for example, the bus 110. For example, the input/output interface 140 may provide the processor 120 with data corresponding to a touch of the user received as input through a touch screen. Further, the input/output interface 140 may output, for example, a command or data received through the bus 110 from the processor 120, the memory 130, the communication interface 160, or the HMT control module 170, through an input/output device (for example, a speaker or a display). For example, the input/output interface 140 may output voice data processed by the processor 120 to the user through a speaker.

The display 150 may display various pieces of information (for example, multimedia data, text data or the like.) to a user. Further, the display 150 may include a touch screen for receiving a command through a touch or a proximity touch on a display by an input means.

The communication interface 160 may connect communication between the electronic device 101 and an external device (for example, the electronic device 102, the electronic device 103, the electronic device 104, or a server 106). For example, the communication interface 160 may be connected to a network 162 through wireless communication or wired communication, and may communicate with an external device. The wireless communication may include at least one of, for example, Wi-Fi, Bluetooth (BT), Near Field Communication (NFC), GPS and cellular communication (for example Long Term Evolution (LTE), LTE-Advanced (LTE-A), Code Division Multiple Access (CDMA), Wideband CDMA (WCDMA), Universal Mobile Telecommunications System (UMTS), Wireless Broadband (WiBro), Global System for Mobile communications (GSM), etc.). The wired communication may include at least one of, for example, a Universal Serial Bus (USB), a High Definition Multimedia Interface (HDMI), a Recommended Standard 232 (RS-232), and a Plain Old Telephone Service (POTS).

According to an embodiment of the present disclosure, the network 162 may be a communication network. The telecommunication network may include at least one of a computer network, Internet, Internet of things, and a telephone network. According to an embodiment of the present disclosure, a protocol (for example, a transport layer protocol, data link layer protocol, or a physical layer protocol) for communication between the electronic device 101 and the external device may be supported by at least one of the applications 134, the API 133, the middleware 132, the kernel 131, and the communication interface 160.

According to various embodiments of the present disclosure, the HMT control module 170 may receive detection information from a second electronic device functionally connected to the electronic device, perform a function of the electronic device corresponding to the detection information, and make a control to output an image corresponding to the function of the electronic device to a third electronic device functionally connected to the electronic device.

The HMT control module 170 may determine, as the detection information, sensing information acquired through at least one of an acceleration sensor, a gravity sensor, a gyro sensor, a tilt sensor, and an illumination sensor of the second electronic device. The HMT control module 170 may perform a function by moving a screen in accordance with the function output through the third electronic device. The HMT control module 170 may change a composition of the screen by performing at least one of moving, zooming-in, and zooming-out the composition of the screen, and scrolling a page displayed on the screen. The HMT control module 170 may perform the function of the second electronic device in the electronic device based on the detection information. The HMT control module 170 may input a predetermined input for performing a particular function of the electronic device into the second electronic device and perform the function in the electronic device based on the detection information. The HMT control module 170 may determine, as the detection information, a touch input detected from the touch screen of the second electronic device. The HMT control module 170 may determine a first coordinate detected from the touch screen of the second electronic device as a second coordinate corresponding to the display of the electronic device, and may output an operation for displaying a point object on the second coordinate through the third electronic device. The HMT control module 170 may receive second detection information from a fourth electronic device functionally connected to the electronic device and perform functions of the electronic device corresponding to the detection information and the second detection information. The HMT control module 170 may output an operation performed by the electronic device as a 3D image through the third electronic device mounted on a user's head. The operation of the HMT control module 170 may be performed by one or more processors 120, or may be performed by the HMT control module 170 based on a control of the processor 120.

The electronic device 102 or the electronic device 103 may include hardware components identical or similar to the electronic device 101, or may further include at least one component which is not included in the electronic device 101. The electronic device 102 may be a device which can be worn on a user's body, and the electronic device 102 described below may be a smart watch or a smart band. When the electronic device 102 or the electronic device 103 is connected to another electronic device (for example, the electronic device 101), the electronic device 102 or the electronic device 103 may be connected to the other electronic device through a communication interface (not shown) (see the communication interface 160 of the electronic device) or through a network 162. Hereinafter, the electronic device 102 may be expressed as the wearable device 102.

Figure 2:
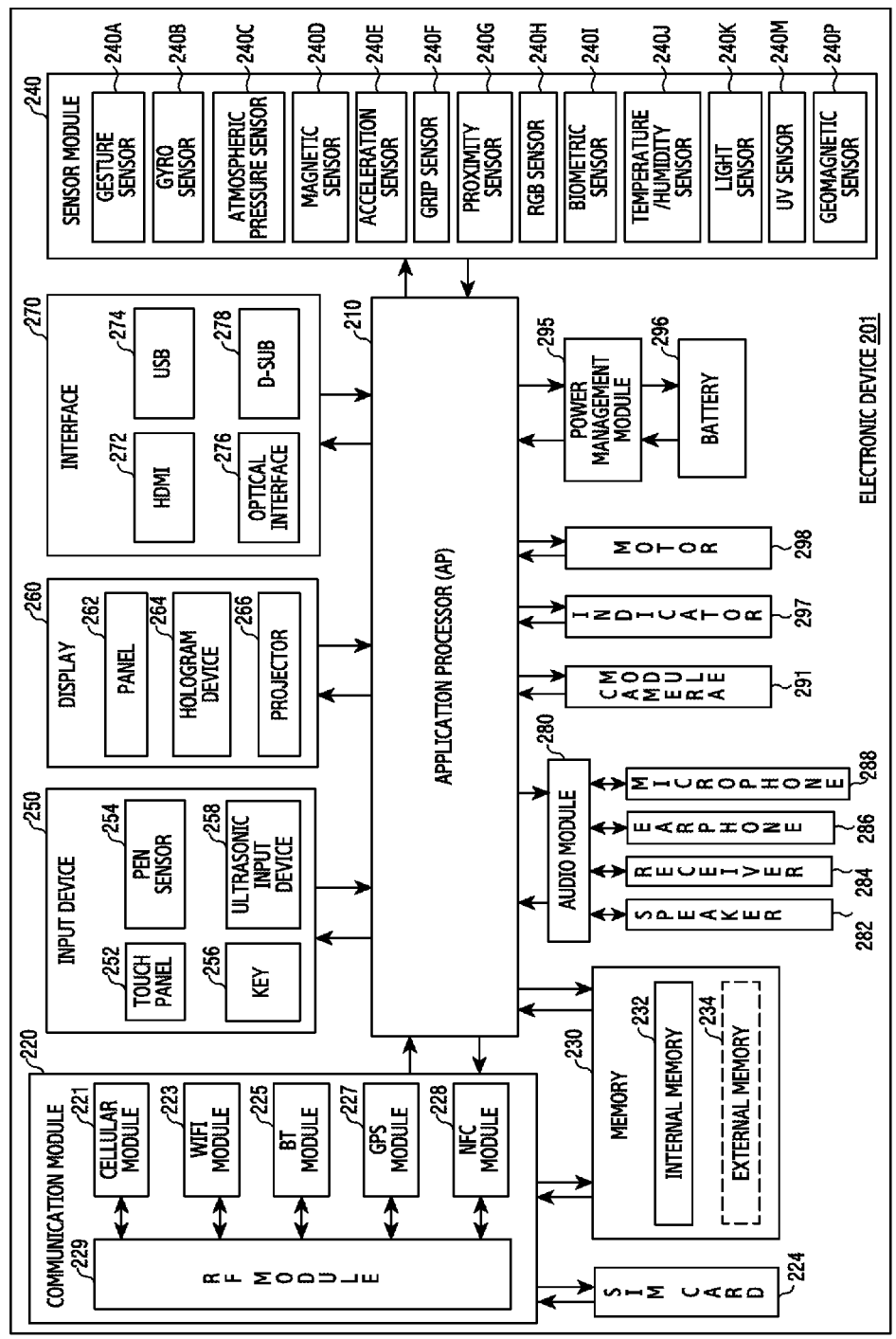
FIG. 2 is a block diagram of an electronic device according to various embodiments of the present disclosure.

FIG. 2 is a block diagram of an electronic device according to various embodiments of the present disclosure.

The electronic device 201 may constitute, for example, all or some of the electronic device 101 illustrated in FIG. 1, or expand all or some of the components of the electronic device 101.

Referring to FIG. 2, the electronic device 201 may include at least one Application Processor (AP) 210, a communication module 220, a Subscriber Identifier Module (SIM) card 224, a memory 230, a sensor module 240, an input device 250, a display 260, an interface 270, an audio module 280, a camera module 291, a power management module 295, a battery 296, an indicator 297, and a motor 298.

One or more processors 210 may be included in the electronic device 101 to perform a predetermined function of the electronic device 101. According to an embodiment of the present disclosure, the processor 210 may include one or more APs and one or more Micro Control Unit (MCUs). According to an embodiment of the present disclosure, the processor 210 may include one or more micro control units as applications or may be functionally connected to one or more micro control units. In FIG. 1, the AP and the MCU may be included in one Integrated Circuit (IC) package, or may be separately configured to be included in different IC packages, respectively. According to an embodiment of the present disclosure, the MCU may be included in an IC package of the AP to be configured as one IC package together with the AP. Although the processor 210 includes the AP or the MCU in FIG. 2, it is only an embodiment for clear understanding, but it is obvious that the processor 210 may also perform operations of the AP and/or the MCU.

The AP may drive an operating system or an application program so as to control a plurality of hardware or software components connected to the AP, and may process various pieces of data including multimedia data and perform calculations. The AP may be implemented by, for example, a System on Chip (SoC). According to an embodiment of the present disclosure, the processor 210 may further include a Graphic Processing Unit (GPU) (not illustrated).

The MCU may be a processor configured to perform a predetermined operation. According to an embodiment of the present disclosure, the MCU may acquire sensing information through one or more predetermined motion sensors (for example, a gyro sensor 240B, an acceleration sensor 240E, or a geomagnetic sensor 240P), compare acquired sensing information, and determine an operation state of the predetermined sensor (for example, the geomagnetic sensor 240P) with reference to a database of the electronic device 101. Further, although the MCU and the components of the sensor module 240 are illustrated as separate components in FIG. 2, the MCU may be implemented to include at least some of the components of the sensor module 240 (for example, at least one of the gyro sensor 240B, the acceleration sensor 240E, and the geomagnetic sensor 240P).

According to an embodiment of the present disclosure, the AP or the MCU may load a command or data received from at least one of a non-volatile memory and other components connected to each of the AP and the MCU in a volatile memory, and may process the loaded command or data. Further, the AP or the MCU may store data received from or generated by at least one of other components in a non-volatile memory.

The communication module 220 may perform data transmission/reception in communication between the electronic device 101 and other electronic devices (for example, the electronic device 102, the electronic device 103, the electronic device 104, or the server 106) through a network. According to an embodiment of the present disclosure, the communication module 220 may include a cellular module 221, a Wi-Fi module 223, a BT module 225, a GPS module 227, an NFC module 228, and a Radio Frequency (RF) module 229.

The cellular module 221 may provide a voice, a call, a video call, a text message service, or an Internet service through a communication network (for example, LTE, LTE-A, CDMA, WCDMA, UMTS, WiBro, or GSM). Furthermore, the cellular module 221 may distinguish between and authenticate electronic devices within a communication network by using, for example, a SIM (for example, the SIM card 224). According to an embodiment of the present disclosure, the cellular module 221 may perform at least some of the functions which the AP 210 may provide. For example, the cellular module 221 may perform at least some of the multimedia control functions.

According to an embodiment of the present disclosure, the cellular module 221 may include a Communication Processor (CP). Furthermore, the cellular module 221 may be implemented by, for example, an SoC. Although the components such as the cellular module 221 (for example, the CP), the memory 230, and the power management module 295 are illustrated as components separated from the AP 210 in FIG. 2, the AP 210 may include at least some of the aforementioned components (for example, the cellular module 221) in an embodiment of the present disclosure.

According to an embodiment of the present disclosure, the AP 210 or the cellular module 221 (for example, the CP) may load a command or data received from at least one of a non-volatile memory and other components connected thereto into a volatile memory and process the loaded command or data. Further, the AP 210 or the cellular module 221 may store data received from or generated by at least one of the other components in a non-volatile memory.

For example, each of the Wi-Fi module 223, the BT module 225, the GPS module 227, and the NFC module 228 may include a processor for processing data transmitted/received through the corresponding module. Although the cellular module 221, the Wi-Fi module 223, the BT module 225, the GPS module 227, and the NFC module 228 are illustrated as separate blocks in FIG. 2, at least some (for example, two or more) of the cellular module 221, the Wi-Fi module 223, the BT module 225, the GPS module 227, and the NFC module 228 may be included in one IC or one IC package in an embodiment of the present disclosure. For example, at least some (for example, the CP corresponding to the cellular module 221 and the Wi-Fi processor corresponding to the Wi-Fi module 223) of the processors corresponding to the cellular module 221, the Wi-Fi module 223, the BT module 225, the GPS module 227, and the NFC module 228 may be implemented as one SoC.

The RF module 229 may transmit/receive data, for example, RF signals. Although not illustrated, the RF module 229 may include, for example, a transceiver, a Power Amplifier Module (PAM), a frequency filter, a Low Noise Amplifier (LNA) or the like. Further, the RF module 229 may further include a component for transmitting/receiving electronic waves over a free air space in wireless communication, for example, a conductor, a conducting wire or the like. Although the cellular module 221, the Wi-Fi module 223, the BT module 225, the GPS module 227, and the NFC module 228 share one RF module 229 in FIG. 2, at least one of the cellular module 221, the Wi-Fi module 223, the BT module 225, the GPS module 227, and the NFC module 228 may transmit/receive an RF signal through a separate RF module in one embodiment.

The SIM card 224 may be a card including a SIM, and may be inserted into a slot formed in a predetermined portion of the electronic device. The SIM card 224 may include unique identification information (for example, an integrated circuit card identifier (ICCID)) or subscriber information (for example, an international mobile subscriber identity (IMSI)).

The memory 230 (for example, the memory 130) may include an internal memory 232 or an external memory 234. The internal memory 232 may include at least one of a volatile memory (for example, a Dynamic Random Access Memory (DRAM), a Static RAM (SRAM), a Synchronous Dynamic RAM (SDRAM), or the like) or a non-volatile memory (for example, a One Time Programmable Read Only Memory (OTPROM), a Programmable ROM (PROM), an Erasable and Programmable ROM (EPROM), an Electrically Erasable and Programmable ROM (EEPROM), a mask ROM, a flash ROM, a NAND flash memory, a NOR flash memory, or the like).

According to an embodiment of the present disclosure, the internal memory 232 may be a Solid State Drive (SSD). The external memory 234 may further include a flash drive, for example, a Compact Flash (CF), a Secure Digital (SD), a Micro-SD, a Mini-SD, an extreme Digital (xD), a memory stick, or the like. The external memory 234 may be functionally connected to the electronic device 201 through various interfaces. According to an embodiment of the present disclosure, the electronic device 201 may further include a storage device (or storage medium) such as a hard drive.

The sensor module 240 measures a physical quantity or senses an operation state of the electronic device 201, and converts the measured or sensed information into an electric signal. The sensor module 240 may include, for example, at least one of a gesture sensor 240A, the gyro sensor 240B, an atmospheric pressure sensor 240C, a magnetic sensor 240D, the acceleration sensor 240E, a grip sensor 240F, a proximity sensor 240G, a color sensor 240H (for example, red, green, and blue (RGB) sensor), a biometric sensor 240I, a temperature/humidity sensor 240J, an illumination sensor 240K, an Ultra Violet (UV) sensor 240M, and the geomagnetic sensor 240P. Additionally or alternatively, the sensor module 240 may include, for example, an E-nose sensor (not illustrated), an electromyography (EMG) sensor (not illustrated), an electroencephalogram (EEG) sensor (not illustrated), an electrocardiogram (ECG) sensor (not illustrated), an Infrared (IR) sensor, an iris sensor (not illustrated), a fingerprint sensor, and the like. The sensor module 240 may further include a control circuit for controlling one or more sensors included therein.

The input device 250 may include a touch panel 252, a (digital) pen sensor 254, a key 256, or an ultrasonic input device 258. The touch panel 252 may recognize a touch input in at least one scheme among, for example, a capacitive type, a resistive type, an infrared type, and an acoustic wave type. The touch panel 252 may further include a control circuit. The capacitive type touch panel may detect a physical contact or proximity. The touch panel 252 may further include a tactile layer. In this case, the touch panel 252 may provide a user with a tactile reaction.

The (digital) pen sensor 254 may be implemented by, for example, using a method identical or similar to a method of receiving a touch input of a user, or using a separate recognition sheet. The key 256 may include, for example, a physical button, an optical key, or a keypad. The ultrasonic input device 258 is a device which may identify data by detecting an acoustic wave with a microphone (for example, a microphone 288) of the electronic device 201 through an input unit generating an ultrasonic signal, and may perform wireless detection. According to an embodiment of the present disclosure, the electronic device 201 may also receive a user input from an external device (for example, a computer or server) connected thereto by using the communication module 220.

The display 260 (for example, the display 150) may include a panel 262, a hologram device 264, or a projector 266. For example, the panel 262 may be, for example, a Liquid Crystal Display (LCD), an Active Matrix Organic Light Emitting Diode (AM-OLED), or the like. The panel 262 may be implemented to be, for example, flexible, transparent, or wearable. The panel 262 may be implemented by a single module together with the touch panel 252. The hologram device 264 may show a three dimensional image in the air by using an interference of light. The projector 266 may display an image by projecting light onto a screen. The screen may be located, for example, inside or outside the electronic device 201. According to an embodiment of the present disclosure, the display 260 may further include a control circuit for controlling the panel 262, the hologram device 264, or the projector 266.

The interface 270 may include, for example, an HDMI 272, a USB 274, an optical interface 276, or a D-subminiature (D-sub) 278. The interface 270 may be included in, for example, the communication interface 160 illustrated in FIG. 1. Additionally or alternatively, the interface 270 may include, for example, a Mobile High-definition Link (MHL) interface, an SD card/Multi-Media Card (MMC) interface, or an Infrared Data Association (IrDA) standard interface.

The audio module 280 may bidirectionally convert a sound and an electrical signal. At least some components of the audio module 280 may be included in, for example, the input/output interface 140 illustrated in FIG. 1. The audio codec 280 may process voice information input or output through, for example, a speaker 282, a receiver 284, earphones 286, or the microphone 288. The camera module 291 is a device that may photograph still and moving images, and may include one or more image sensors (for example, a front sensor or a rear sensor, not shown), a lens (not shown), an image signal processor (ISP) (not shown), or a flash (for example, an LED or a xenon lamp, not shown) according to an embodiment of the present disclosure.

The power management module 295 may manage power of the electronic device 201 and include, for example, a Power Management IC (PMIC), a charger IC, or a battery or fuel gauge. The PMIC may be mounted in, for example, an integrated circuit or an SoC semiconductor. Charging methods may be classified into a wired charging method and a wireless charging method. The charger IC may charge a battery and can prevent introduction of over-voltage or over-current from a charger.

According to an embodiment of the present disclosure, the charger IC may include a charger IC for at least one of the wired charging and the wireless charging. Examples of the wireless charging method may include a magnetic resonance type, a magnetic induction type, or an electromagnetic wave type, and an additional circuit for wireless charging, such as a coil loop circuit, a resonance circuit, or a rectifier circuit may be added.

The battery gauge may measure, for example, a residual quantity of the battery 296, and a voltage, a current, or a temperature, such as during the charging. The battery 296 may store or generate electricity and may supply power to the electronic device 201 using the stored or generated electricity. The battery 296 may include, for example, a rechargeable battery or a solar battery.

The indicator 297 may display a predetermined state of the electronic device 201 or a part of the electronic device 201 (for example, the AP 210), for example, a booting state, a message state, a charging state, or the like. The motor 298 may convert an electrical signal into a mechanical vibration. Although not illustrated, the electronic device 201 may include a processing device (for example, a GPU) for supporting mobile TV. The processing device for supporting mobile TV may process, for example, media data associated with the standard of Digital Multimedia Broadcasting (DMB), Digital Video Broadcasting (DVB), a media flow, or the like.

Each of the above described elements of the electronic device according to various embodiments of the present disclosure may be formed of one or more components, and the name of a corresponding element may vary according to the type of an electronic device. The electronic device according to various embodiments of the present disclosure may be formed to include at least one of the above described components, and some of the components may be omitted or additional components may be further included. Further, some of the elements of the electronic device according to various embodiments of the present disclosure may be coupled to form a single entity while performing the same functions as those of the corresponding elements before the coupling.

Hereinafter, various embodiments in which the electronic device 101 performs a function corresponding to control information received by the electronic device 101 based on the received control information and displays the function on the display 150 of the electronic device 101 will be described.

Figure 3:
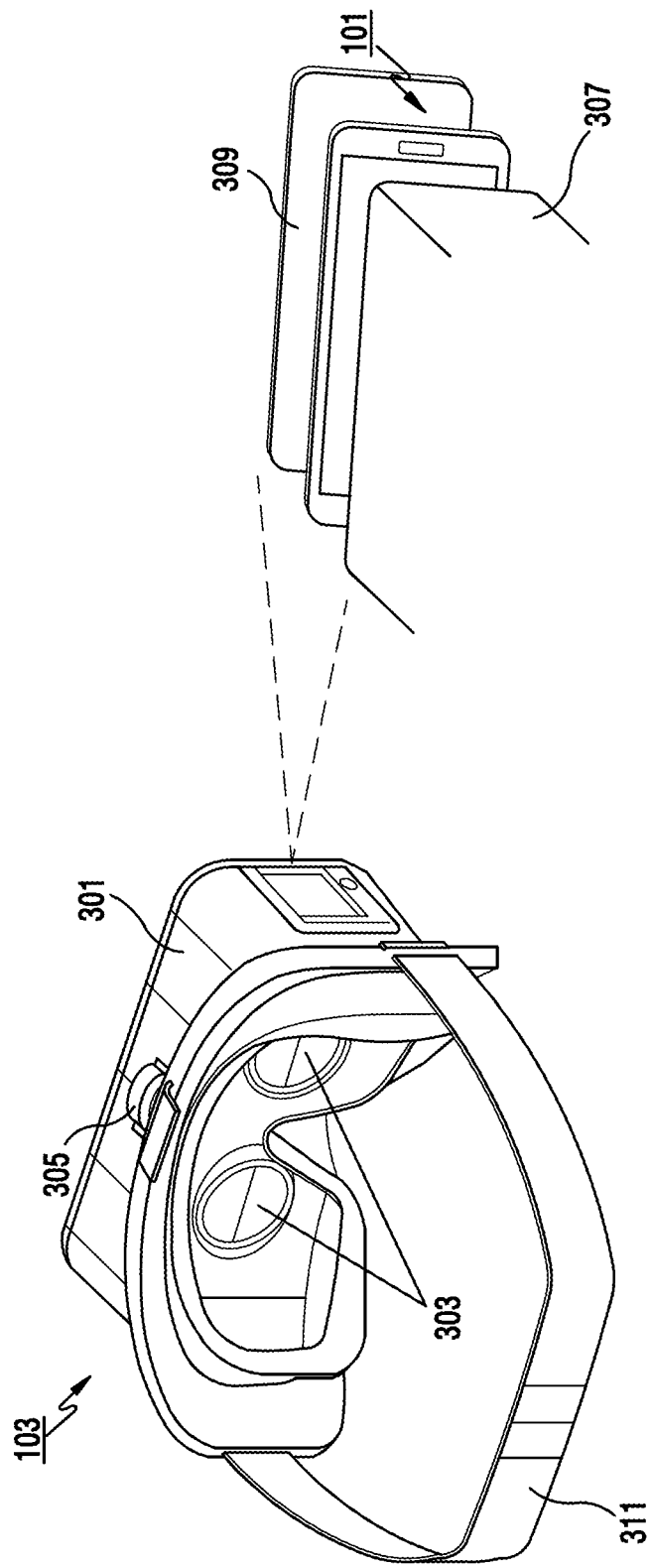
FIG. 3 illustrates a Head Mounted Theater (HMT) device to which an electronic device is connected according to various embodiments of the present disclosure.

FIG. 3 illustrates an HMT device to which the electronic device is connected according to various embodiments of the present disclosure.

Through an image processing unit (for example, an HMT device) functionally connected (for example, connected through a particular communication scheme such as a USB) to the electronic device 101, the electronic device 101 may represent a composition of the screen displayed on the display 150 of the electronic device 101 as if the screen is displayed in front of user's eyes (through optical processing). A technology for outputting the screen composition displayed on the display 150 of the electronic device 101 through an image processing unit (for example, an HMT device) functionally connected to the electronic device 101 may use a scheme that implements at least some augmented reality techniques or virtual reality techniques. The HMT device described in the present disclosure may be a device included in a category identical or similar to that of the HMD.

Although there are various methods for implementing the HMT device, a structure having the form illustrated in FIG. 3 will be described as an embodiment of the present disclosure for convenience of the description. According to an embodiment of the present disclosure, the electronic device 101 is mounted on a particular mechanism (e.g., a frame or body) of the HMT device 103 which can be worn on a head and a connection therebetween is made through wired communication such as a USB or wireless communication such as Wi-Fi or BT. The HMT device 103 may provide the user with an image displayed on the display 150 of the electronic device 101 connected to the mechanism through at least one lens 303 included in the HMT device 103

Referring to FIG. 3, the HMT device 103 may include a frame 301, a cover 309 for fixing the electronic device 101 to the frame 301, and a wearable member 311 connected to the frame to be worn on a human's body, and the electronic device 101 may be configured to be attached to/detached from the frame. The frame 301 and the cover 309 may be separately configured as illustrated in FIG. 3, but the present disclosure is not limited thereto. The electronic device 101 may be inserted into the frame and the cover which are integrally configured (for example, a slide type).

The frame 301 may be worn on a user's body through various components. For example, a wearable member 311 may be located such that a frame 301 fits on a user's face around the user's eyes through a band (e.g., made with an elastic material), and the wearable member 311 may include eyeglass temples, helmets, or straps. The frame 301 may include at least one of a touch panel, a display position controller 305, and a lens controller (not shown) on an outer surface of the frame 301. The frame 301 may include a space or structure 307 to be combined with the electronic device 101, and may further include a connector to be combined and communicate with the electronic device 101. The frame 301 may include a control device for controlling the electronic device 101 on a side surface thereof. The control device may include, for example, at least one of a touch pad, a joystick, a button, a wheel key, and a touch panel. The touch pad may display a Graphical User Interface (GUI) which may control the function of the electronic device 101 (for example, sound or image).

One surface of the frame 301 may have a curved structure having a facial shape so that the user can wear the frame 301. One surface of the frame 301 may include a nose recess and the nose recess may be exposed on the outside of the frame 301 through at least some of the lens so that the user can see the display device (for example, the display 150 of the electronic device 101) with the user's eyes. The frame 301 may be made of at least one of light materials (for example, plastic) to allow the user to easily wear it and materials (for example, glass, ceramic, metal (for example, aluminum), or metal alloys (for example, steel, stainless steel, titanium, or magnesium alloy) to improve strength or beauty of appearance.

One surface of the frame 301 may include a space or cavity which can be connected to the electronic device 101, and the space of the frame 301 may be formed of an elastic material or have a variable structure, and thus the size of the space of the frame 301 may change to be connected to the electronic device 101 regardless of the size of the electronic device 101.

Various methods in which the user mounts the electronic device 101 on the frame based on the HMT device 103 may be described. First, the electronic device 101 may be placed on the space of the frame 301 for holding the electronic device 101, and the electronic device 101 seated in the space of the frame 103 may be slid to be connected to a connector.

The HMT device 103 may further include a separate cover 309 to more safely fix the electronic device 101. In a method of mounting the electronic device 101 on the HMT device 103 having the cover, the above described connection operation may be performed and the cover 309, which has been already separated, may be connected to the frame 301 for the connection with the electronic device 101. Through the method, the cover 309 can prevent damage of the electronic device 101 due to separation of the electronic device 101 from the frame 301 of the HMT device 103 by movement of the user, and also protect the electronic device 101 from an external impact.

According to various embodiments of the present disclosure, the HMT device 103 may include a slot located in at least one side of the frame 301 into which the electronic device 101 may be inserted, and the electronic device 101 may be connected to the HMT device 103 through the slot. According to an embodiment of the present disclosure, the electronic device 101 may be slid to be inserted into the slot located at the side of the frame 301, and the electronic device 101 inserted through the slot may be connected to an internal connector.

According to various embodiments of the present disclosure, the HMT device 103 may include a control device in a side surface of the frame 301 to control the HMT device 103. The control device may include, for example, at least one of a touch panel, a button, a wheel key, and a touch pad. The touch panel may receive a user's touch input (a direct touch input or a hovering input). The electronic device 101 and the frame 301 may be connected to each other through an interface such as a USB and may transmit a touch input received by the touch panel to the electronic device 101. The electronic device 101 may control a function corresponding to the touch input in response to the touch input received by the touch panel. For example, the electronic device 101 may control a volume or image reproduction in response to the received touch input.

The frame 301 of the HMT device 103 may largely include a controller (MCU), a communication unit (communication module), a sensor unit (sensor module), an input unit (input device), a power device (power management module), an eye tracking unit (eye tracker), a motor (vibrator), and a focus controller (adjustable optics).

The controller (MCU) may control a plurality of hardware components connected to the controller by executing an operating system or an embedded Software (S/W) program.

The communication unit may connect the frame 301 of the HMT device 103 and the electronic device 101 through wired/wireless communication and transmit/receive data. According to an embodiment of the present disclosure, the communication unit may include at least one of a USB module, Wi-Fi module, BT module, NFC module, and GPS module. According to an embodiment of the present disclosure, at least some (two or more) of the Wi-Fi module, BT module, GPS module, and NFC module may be included in one IC or IC package.

The sensor unit may measure a physical quantity or detect an operation state of the HMT device 301, and may convert the measured or detected information to an electrical signal. According to an embodiment of the present disclosure, the sensor unit may include at least one of an acceleration sensor, a gyro sensor, a geomagnetic sensor, a magnetic sensor, a proximity sensor, a gesture sensor, a grip sensor, and a biometric sensor. The acceleration sensor, the gyro sensor, and the geomagnetic sensor may detect a motion of the user's head when wearing the HMT device 103. The proximity sensor or the grip sensor may detect whether the user wears the HMT device 103. According to an embodiment of the present disclosure, whether the user wears the HMT device 103 may be detected through at least one of IR recognition, pressurization recognition, and a capacitance (or dielectric constant) change according to the wearing by the user. The gesture sensor may detect a movement of a user's hand or finger to receive it as an input operation of the HMT device 103. Additionally or alternatively, the sensor unit may recognize a user's biometric information by using, for example, a biometric recognition sensor (or biometric sensor) such as an E-nose sensor, an EMG sensor, an EEG sensor, an ECG sensor, or an iris sensor. The sensor unit may further include a control circuit for controlling one or more sensors included therein.

The input unit may include a touch pad and a button. The touch pad may recognize a touch input based on at least one scheme among, for example, a capacitive scheme, a resistive scheme, an infrared scheme, and an ultrasonic scheme.

Further, the touch pad may further include a control circuit. The capacitive type touch pad may recognize physical contact or proximity. The touch pad may further include a tactile layer. In this case, the touch pad may provide a user with a tactile reaction. The button may include, for example, a physical button, an optical key, or a keypad.

The eye tracking unit (eye tracker) may track a user's eyes by using, for example, at least one of an Electrical Oculography (EOG) sensor, coil systems, dual Purkinje systems, bright pupil systems, and dark pupil systems. Further, the eye tracking unit may further include a micro camera for tracking a user's eyes.

The focus controller (adjustable optics) may measure an Inter-Pupil Distance (IPD) of the user to allow the user to view an image suitable for a user's eyes and control a distance from a lens and a position of the display 150 of the electronic device 101.

The configuration of the HMT device 103 is not limited to the above described method, and may include at least some components of the electronic device 201 described in FIG. 2. Hereinafter, the electronic device 103 may be expressed as the HMT device 103.

Figure 4:
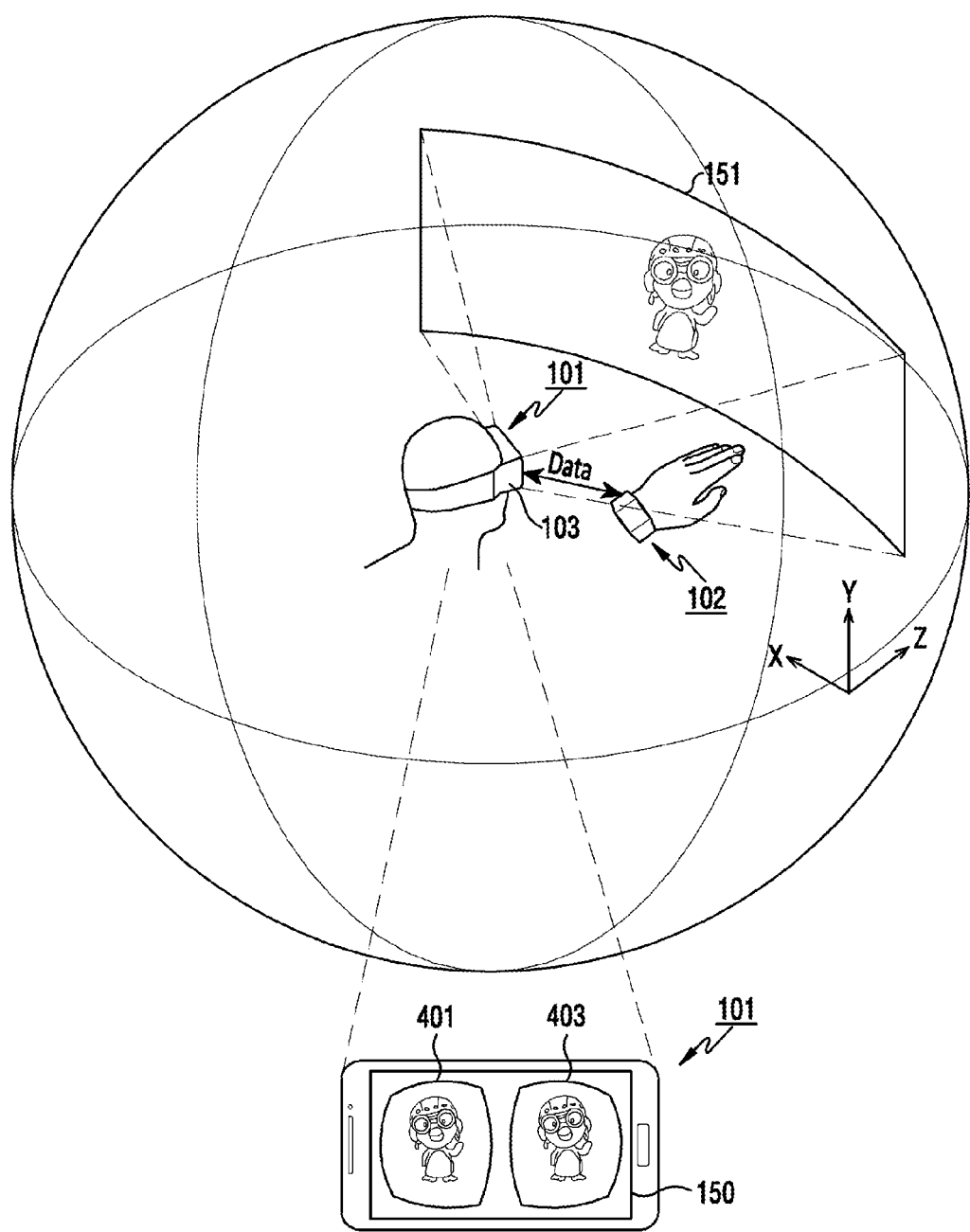
FIG. 4 illustrates an HMT mode operating based on an electronic device and an HMT device according to various embodiments of the present disclosure.

FIG. 4 illustrates an HMT mode operating based on an electronic device and an HMT device according to various embodiments of the present disclosure.

According to various embodiments of the present disclosure, the electronic device 101 has a normal mode, and a Head-Mounted Mode (HMM) or HMT mode. For example, when the electronic device 101 is mounted on the HMT device 103 and operates, the electronic device 101 may switch from the normal mode to the HMT mode. The electronic device 101 may divide one image into two images in the HMT mode and display the divided images on the display 150. According to an embodiment of the present disclosure, when the electronic device 101 is in the HMT mode, the electronic device 101 may divide the one image displayed in the normal mode into a left image 401 and a right image 403 and display the divided images on the display 150. The user may recognize the left image 401 and the right image 403 displayed on the display 150 as one image 151 through the HMT device 103. Further, according to an embodiment of the present disclosure, the divided images (for example, the left image 401 and the right image 403) displayed on the display 150 may be distorted by the lens (for example, the lens 303 of FIG. 3) included in the HMT device 103. The electronic device 101 may inversely distort the plane images divided and displayed on the display 150 according to a characteristic of the lens in order to provide the user with an image which is not distorted.

The electronic device 101 may be connected to at least one wearable device (for example, the electronic device 102) through network communication (for example, wireless communication). When executing the HMT mode in which screen composition displayed on the display 150 of the electronic device 101 is provided to the user through the HMT device 103 functionally connected to the electronic device 101, the electronic device 101 may transmit/receive data to/from the wearable device 102. According to an embodiment of the present disclosure, when the electronic device 101 enters the HMT mode, the electronic device 101 may transmit mode change information for executing the HMT mode to the wearable device 102 connected through the network communication. The wearable device 102 receiving the mode change information transmitted from the electronic device 101 may switch the mode of the wearable device 102 to the HMT mode. The wearable device 102 in the HMT mode may transmit data corresponding to a gesture detected by the wearable device 102 or an input detected by the wearable device 102 to the electronic device 101 and the electronic device 101 may perform an operation corresponding to the data transmitted from the wearable device 102. The HMT device 103 may display a screen composition displayed on the display 150 according to user's eyes based on the operation performed by the electronic device 101. According to an embodiment of the present disclosure, in a display method of the HMT device 103, a screen composition displayed on the display 150 of the electronic device 101 may be provided to the user by an optical processing method through a lens included in the HMT device 103. Further, the method may be a method in which the HMT device 103 receives a screen composition displayed on the display 150 of the electronic device 101 and the display (or an image output device (not shown)) outputs the screen composition or a method in which the HMT device 103 processes data input into the HMT device 103 through the input/output interface 140 of the electronic device 101 and the display (or an image output device (not shown)) of the HMT device 103 outputs the data. The wearable device 102 may transmit data corresponding to a gesture detected through functionally connected sensors (for example, sensors that perform functions identical or similar to those of the sensors included in the sensor module 240 of the electronic device 101), data corresponding to an input detected through the display 150 (for example, a touch screen) of the wearable device 102, and data detected by the wearable device 102 such as data corresponding to an input detected through a microphone of the wearable device 102 to the electronic device 101 through designated network communication (for example, wireless communication connected to the electronic device 101). Based on received data, the electronic device 101 may perform an operation that matches control information included in the data, and may display the corresponding operation (or function) on the display 150 through a display interface of the HMT mode for providing the user with the operation through the HMT device 103.

In the following description of drawings, a screen composition output to the display 150 of the electronic device 101 may be an image processed in the HMT mode as described in FIG. 3. Further, in the following description of drawings, a screen shown in the air (or a 3D screen, hereinafter referred to as a 3D screen 151) may be an image corresponding to the screen composition (or image) displayed on the display 150 of the electronic device 101 and provided (or shown) to the user through the HMT device 103. In drawings below, although the electronic device 101 is not illustrated, the electronic device 101 may operate while mounted on the HMT device 103 as described in FIG. 3.

Figure 5:
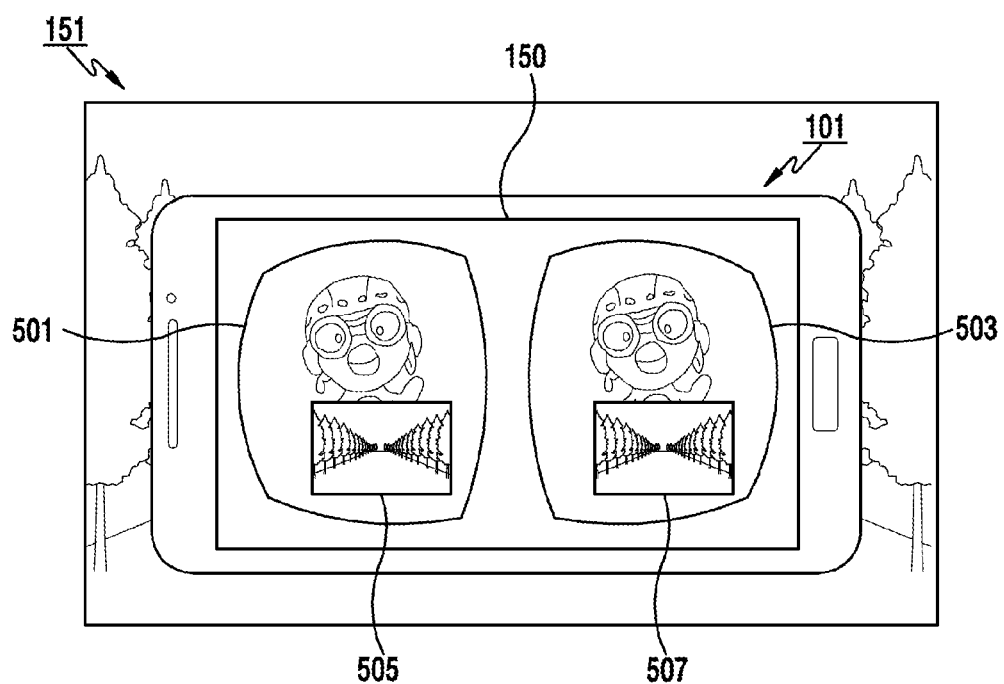
FIG. 5 illustrates a display screen of an electronic device in an HMT mode according to various embodiments of the present disclosure.

FIG. 5 illustrates a display screen of the electronic device in the HMT mode according to various embodiments of the present disclosure.

According to various embodiments of the present disclosure, the electronic device 101 may display an image acquired through a camera connected to the electronic device 101 or the HMT device 103 on the display 150 in the HMT mode. According to an embodiment of the present disclosure, the electronic device 101 may divide one image into a left image 501 and a right image 503 and display the divided images on the display 150 in the HMT mode. The electronic device 101 may display the image acquired through the camera connected to the electronic device 101 or the HMT device 103 in a predetermined position of the display 150. According to an embodiment of the present disclosure, when the electronic device 101 displays an image acquired through the camera in a state where the one image is divided into the left image 501 and the right image 503 and the divided images are displayed on the display 150 in the HMT mode, the electronic device 101 may divide the image acquired through the camera into a left image 505 and a right image 507. The electronic device 101 may make a control to display the image acquired through the camera on a part of the image displayed on a large screen of the 3D screen (for example, the 3D screen 151 of FIG. 4), or may display the image acquired through the camera on the large screen of the 3D screen 151 and the image output from the electronic device 101 on a part of the 3D screen.

For example, referring to FIG. 5, the electronic device 101 may display the left image 505 of the camera on the left image 501 of the one image and the right image 507 of the camera on the right image 503 of the one image, and the user may recognize as if the image acquired through the camera is included in a predetermined position of the image of the electronic device 101 displayed on the large screen of the 3D screen 151 through the HMT device 103. Further, like the above described method, the electronic device 101 may display the image acquired through the camera on the large screen of the 3D screen 151 and the image output from the electronic device 101 in a predetermined position of the 3D screen 151. Through the above described method, an operation of displaying one image within another image may be implemented by a Picture In Picture (PIP) or Picture On Picture (POP) technique. Based on the above described embodiment of the present disclosure, the user may identify a surrounding environment through a camera image while experiencing a virtual environment through the HMT device 103 as necessary. According to the above description, when displaying the image on the display 150, the electronic device 101 divides the image into the left image and the right image and displays the divided images, but it is only a display method in the HMT mode corresponding to the HMT device 103 according to an embodiment of the present disclosure. The method is not limited to dividing the image into the left image and the right image, and an HMT mode corresponding to the HMT device 103 in various methods such as dividing the image into a top image and a bottom image may be applied. Further, when changing an interface of the display 150, the electronic device 101 may change the interface displayed on the display 150 based on modes of various devices such as a 3D image output device as well as the HMT mode corresponding to the HMT device 103 or may provide a 3D screen or a 3D image to the user based on the changed display interface.

Figure 6A:
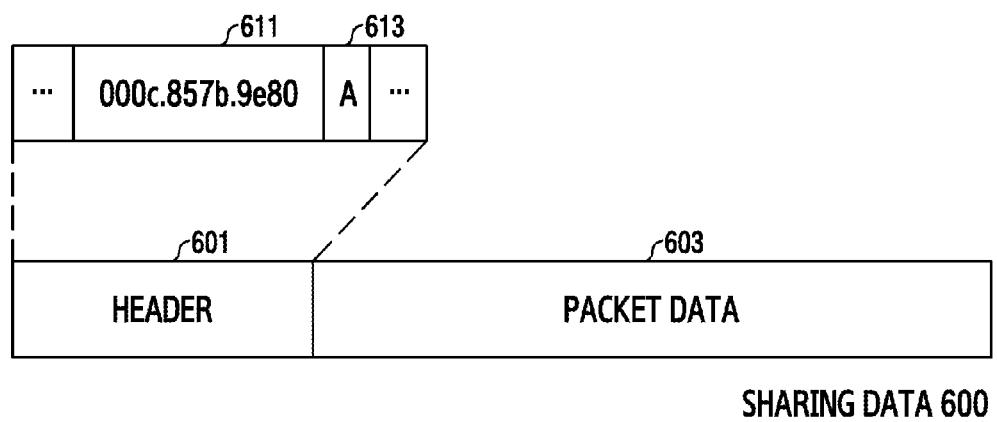
FIGS. 6A and 6B illustrate data which an electronic device transmits/receives to/from a wearable device according to various embodiments of the present disclosure.
Figure 6B:
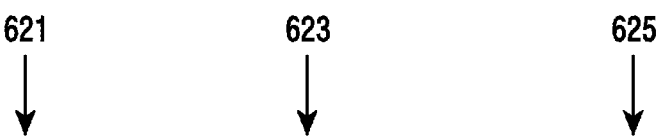

FIGS. 6A and 6B illustrate data which the electronic device transmits/receives to/from the wearable device according to various embodiments of the present disclosure.

The electronic device 101 may receive data (for example, control information) from at least one wearable device 102 connected through network communication in the HMT mode state. The control information received from the wearable device 102 may be information input from various input devices or detection devices such as at least one sensor, microphone, button key, and touch panel (for example, a touch panel of a touch screen), and the input information may be information which may control the electronic device 101 in the HMT mode of the electronic device 101. The electronic device 101 may include control information for controlling the electronic device 101 that matches the information input into the wearable device 102.

Hereinafter, various embodiments of the present disclosure will be described with reference to FIG. 6A.

Referring to FIG. 6A, the electronic device 101 may receive control information 600 (or data 600 to be shared) input in the HMT mode of at least one wearable device 102 from the wearable device 102 connected through network communication. The control information 600 may include a header 601 and packet data 603. The header 601 may include a device identification information region 611 and/or a packet attribute region 613 of the electronic device (for example, the wearable device 102) transmitting the control information. The device identification information 611 may be unique information set to the electronic device such as a Unique User Identifier (UUID) and an International Mobile Equipment Identity (IMEI) assigned to the electronic device (for example, the wearable device 102) transmitting the control information (for example, the data 600 to be shared). The packet data 603 may include data acquired by some units (for example, at least one sensor module or an input device) of the wearable device 102 corresponding to packet attributes designated to the packet attributes 613. According to an embodiment of the present disclosure, the wearable device 102 may acquire data on a movement direction and/or acceleration of the wearable device 102 through an acceleration sensor in the form of vector in a 3D coordinate system of x, y, and z, insert the acquired data into the packet data 603, and insert packet attributes (for example, A) corresponding to the data on the movement direction and/or acceleration of the wearable device 102 into the packet attribute region 613 of the header 601. The packet attributes "A" may be data identification information for determining the type of data acquired by the wearable device 102 such as the data on the movement direction and/or acceleration of the wearable device 102 based on the 3D coordinate system of x, y, and z or module identification information for determining a module such as some units (for example, an acceleration sensor) of the wearable device 102 having acquired the data. When the electronic device 101 receives the control information 600 from the wearable device 102 connected through network communication, the electronic device 101 may determine the electronic device (for example, the wearable device 102) having transmitted the control information 600 based on the device identification information included in the device identification information region 611 of the control information 600, determine a function of controlling the control information 600 based on the information included in the packet attribute area 613, and perform a predetermined operation corresponding to the packet attributes determined based on the information included in the packet data 603. When transmitting the control information (for example, the data 600 to be shared) to the electronic device 101, the wearable device 102 may transmit two or more packet attributes 613 and the acquired data corresponding to the packet attributes 613 as the data 600 to be shared.

Hereinafter, various embodiments of the present disclosure will be described with reference to FIG. 6B.

Referring to FIG. 6B, the electronic device 101 may determine an operation that matches the control information (for example, the data 600 to be shared of FIG. 6A) received from the wearable device 102 connected through network communication based on a database of the electronic device 101 and control a predetermined function of the electronic device 101 in response to the determined operation. According to an embodiment of the present disclosure, when determining the operation corresponding to the received control information, the electronic device 101 may compare the control information with information of at least one data table included in the database of the electronic device 101.

The electronic device 101 may analyze the control information received from the wearable device 102 based on a data table 620. According to an embodiment of the present disclosure, the electronic device 101 may determine an operation performed by the electronic device 101 based on data included in the header 601 and the packet data 603 of the received control information (for example, the data 600 to be shared of FIG. 6A). For example, control devices 621 of the data table 620 may include information on some units (for example, a sensor module and an input device) acquiring the data included in the packet data 625 from the wearable device 102 and may be determined based on the packet attributes 623 included in the control information received from the wearable device 102. When the wearable device 102 detects an input, the packet attributes 623 included in the data table 620 may indicate device identification information (for example, device identification information "A" in a case of an acceleration sensor) of the device which detects the corresponding input. The packet data 625 included in the data table 620 may determine an operation for controlling the electronic device 101 based on the control device 621 or the packet attributes 623 and may control a function performed in the HMT mode in the way determined based on the data included in the packet data 625.

Figure 7A:
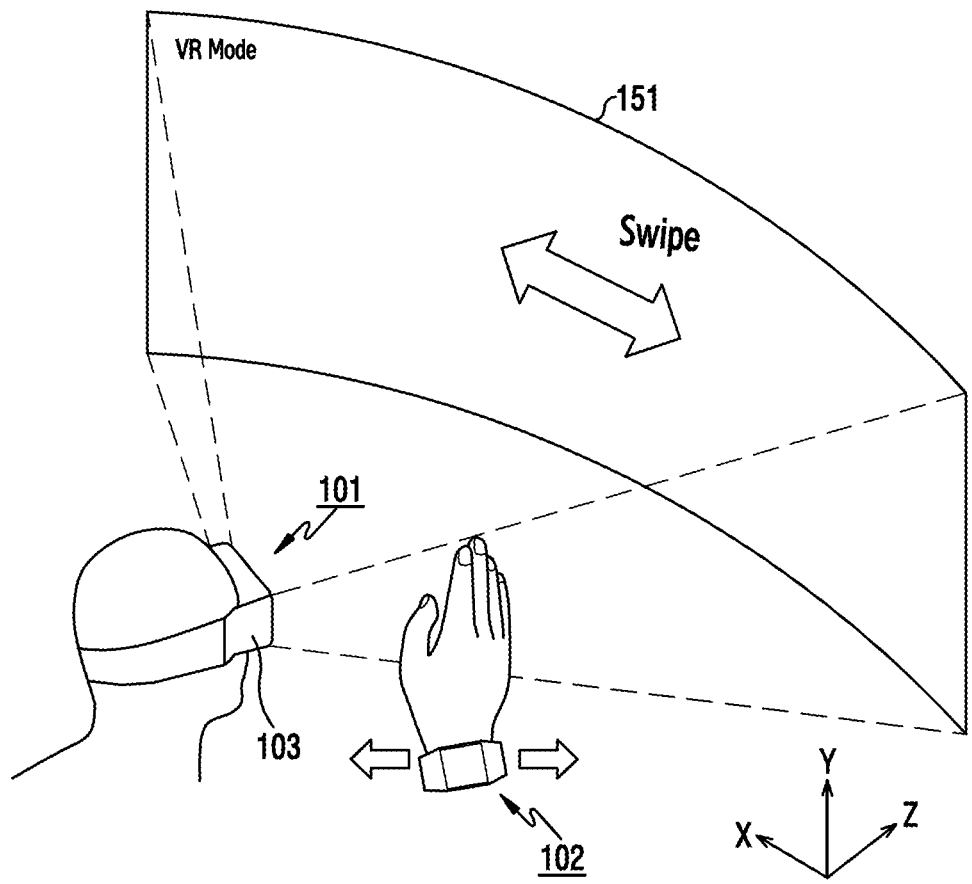
FIGS. 7A, 7B, and 7C illustrate various embodiments of controlling an electronic device based on data received from a wearable device according to various embodiments of the present disclosure.
Figure 7B:
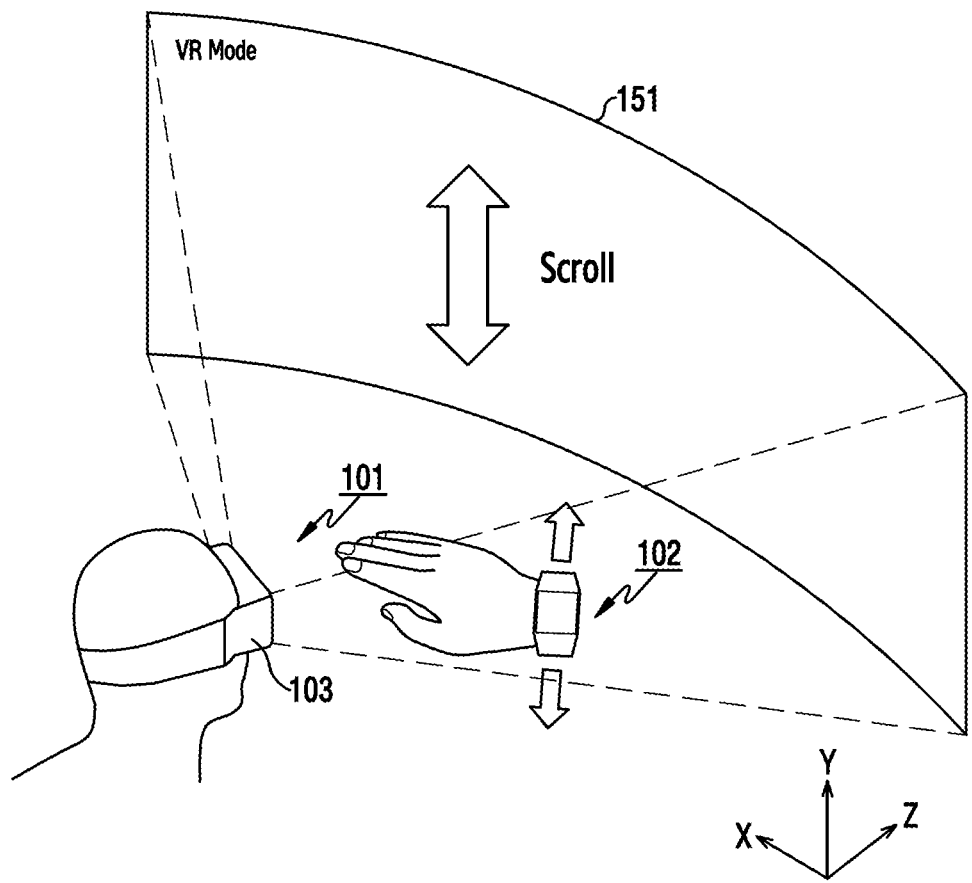
Figure 7C:
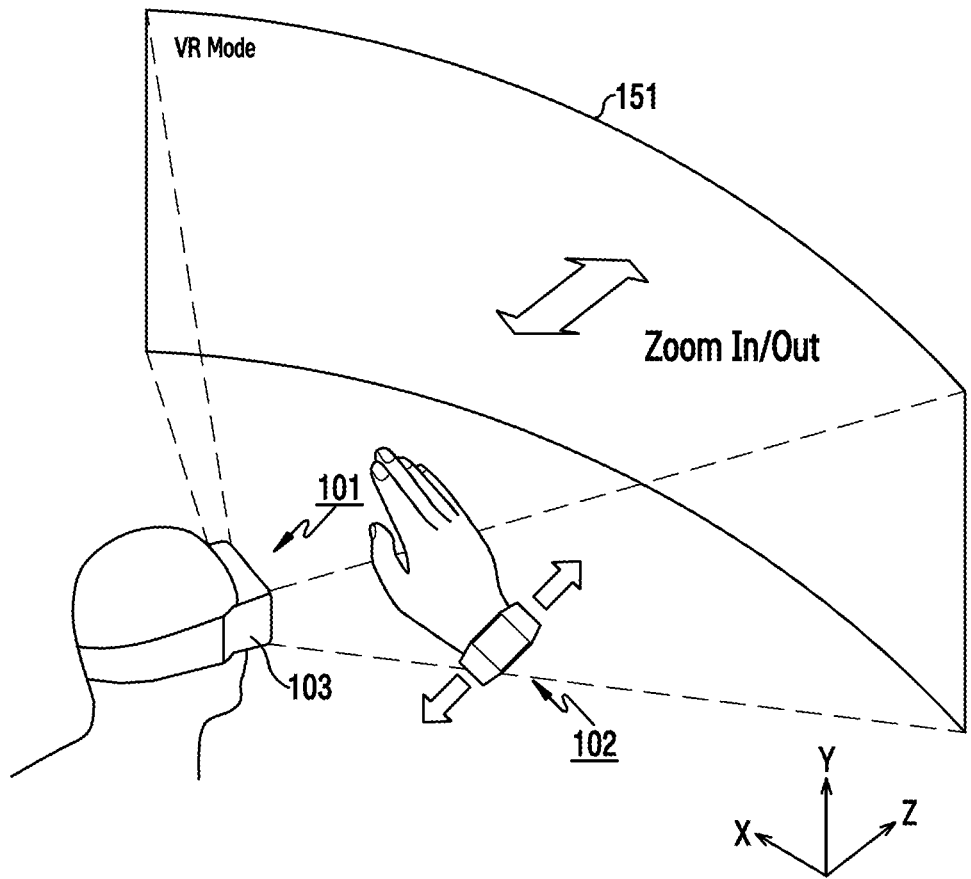

FIGS. 7A, 7B, and 7C illustrate various embodiments of controlling the electronic device based on data received from the wearable device according to various embodiments of the present disclosure.

When the electronic device 101 detects a functional connection with the HMT device 103 (for example, coupling with the HMT device 103), the electronic device 101 may execute the HMT mode and transmit mode change information indicating the execution of the HMT mode to at least one wearable device 102 connected to the electronic device 101. The wearable device 102 receiving the mode change information on the HMT mode from the electronic device 101 may (or may not) execute the HMT mode based on setting information of a memory or the mode change information. When the HMT mode is executed, the wearable device 102 may determine an input detected by the wearable device 102 as input data (hereinafter, referred to as detection data) to control the electronic device 101. Determining the input as the input detection information to control the electronic device 101 may include determining the data received from the wearable device 102 as the data for controlling the electronic device 101. According to an embodiment of the present disclosure, the wearable device 102 may include a sensor module including at least one of a gravity sensor, an acceleration sensor, a gesture sensor, a grip sensor, a proximity sensor, a biometric sensor, an illumination sensor, and a geo-magnetic sensor. For example, the wearable device 102 may include units identical or similar to those included in the electronic device 101 illustrated in FIG. 1, or may include some of the units of the electronic device 101. The wearable device 102 may detect a motion (for example, a gesture) of the wearable device 102 based on the sensor module. When detecting the motion, the wearable device 102 may detect a vector in a reference coordinate system (for example, a 3D coordinate system including x, y, and z axes) set to the wearable device 102 based on the sensor module. According to an embodiment of the present disclosure, the wearable device 102 may determine, as the detection information, the vector acquired through the sensor module along a motion trace in a state where the wearable device 102 is worn on a user's body. The wearable device 102 may transmit various inputs (for example, detection information) detected in the HMT mode to the electronic device 101. The electronic device 101 may control the electronic device 101 in the HMT mode based on the detection information received from the wearable device 102. According to an embodiment of the present disclosure, a predetermined operation corresponding to the detection information in the HMT mode may be an operation for controlling a display screen of the display 150 of the electronic device 101 which is output through the HMT device 103.

Hereinafter, various embodiments of the present disclosure will be described with reference to FIG. 7A.

Referring to FIG. 7A, the electronic device 101 may control a display interface of the display 150 to move, from side to side, the 3D screen 151 displayed based on screen composition displayed on the display 150 of the electronic device 101 based on the detection information received from the wearable device 102 connected through network communication. According to an embodiment of the present disclosure, when acquiring the detection information, the wearable device 102 may acquire state information of the wearable device 102 and/or motion information of the wearable device 102 through the sensor module included in the wearable device 102. According to an embodiment of the present disclosure, the wearable device 102 may determine a 3D coordinate system set to the wearable device 102 through the sensor module. The wearable device 102 may detect a vector corresponding to the 3D coordinate system in a state where the wearable device 102 is moved from side to side by the user. The wearable device 102 may transmit detection information including the acquired vector to the electronic device 101. When the wearable device 102 transmits the detection information to the electronic device 101, the detection information may include the vector acquired through the sensor module and at least some pieces of information on the 3D coordinate system set to the wearable device 102, device identification information of the wearable device 102, and information related to the data acquired through the sensor module such as packet attributes of the acquired vector.

The electronic device 101 may determine control information of the electronic device 101 corresponding to the detection information received from the wearable device 102 based on the database included in the memory 130. According to an embodiment of the present disclosure, the wearable device 102 may acquire, from the detection information received by the electronic device 101, a vector corresponding to the detection of an operation for movement in an x axis direction (and/or −x axis direction) through the sensor module. The electronic device 101 may determine control information for controlling a screen composition displayed on the display 150 to move the 3D screen 151 from side to side in accordance with the vector in the x axis direction of the 3D coordinate system included in the detection information based on the database. The database, which is a basis of the operation for determining the vector in the x axis direction of the 3D coordinate system included in the detection information as the control information for making a control to move the 3D screen 151 from side to side based on the display 150 of the electronic device 101, may be defined by previously tested information. According to an embodiment of the present disclosure, when the electronic device 101 rotates, the screen composition displayed on the display 150 of the electronic device 101 may rotate in response to the rotation of the electronic device 101. In this case, the control information for movement in the left/right direction (for example, x axis direction) determined based on the detection information received by the electronic device 101 may perform an operation for moving the screen composition displayed on the display 150 of the electronic device 101 in the left/right direction (for example, horizontal movement), not the rotation. In the following description, controlling the 3D screen 151 provided to the user according to control information determined based on detection information may correspond to controlling the display 150 of the electronic device 101 or a screen composition displayed on the display 150 of the electronic device 101.

Hereinafter, various embodiments of the present disclosure will be described with reference to FIG. 7B.

Referring to FIG. 7B, the electronic device 101 may upwardly or downwardly move a screen composition displayed on the display 150 of the electronic device 101 based on the detection information received from the wearable device 102 connected through network communication. According to an embodiment of the present disclosure, when acquiring the detection information, the wearable device 102 may acquire state information of the wearable device 102 and/or motion information of the wearable device 102 through the sensor module included in the wearable device 102. According to an embodiment of the present disclosure, the wearable device 102 may determine a 3D coordinate system set to the wearable device 102 through the sensor module. The wearable device 102 may detect a vector corresponding to the 3D coordinate system in a state where the wearable device 102 is moved by the user from side to side. The wearable device 102 may transmit detection information including the acquired vector to the electronic device 101. When the wearable device 102 transmits the detection information to the electronic device 101, the detection information may include the vector acquired through the sensor module and at least some pieces of information on the 3D coordinate system set to the wearable device 102, device identification information of the wearable device 102, and information related to the data acquired through the sensor module such as packet attributes of the acquired vector.

The electronic device 101 may determine control information of the electronic device 101 corresponding to the detection information received from the wearable device 102 based on the database included in the memory 130. According to an embodiment of the present disclosure, the wearable device 102 may acquire, from the detection information received by the electronic device 101, a vector corresponding to the detection of an operation for movement in a y axis direction (and/or −y axis direction) through the sensor module. The electronic device 101 may determine control information for making a control to upwardly/downwardly move the screen composition displayed on the display 150 of the electronic device 101 in accordance with the vector in the x axis direction of the 3D coordinate system included in the detection information based on the database. The database which is a basis of the operation for determining the vector in the y axis direction of the 3D coordinate system included in the detection information as the control information for making a control to upwardly/downwardly move the screen composition displayed on the display 150 of the electronic device 101 may be defined by previously tested information. According to an embodiment of the present disclosure, the control information on movement in the up/down direction (for example, y axis direction) determined based on the detection information received by the electronic device 101 may perform an operation for upwardly/downwardly scrolling the screen composition displayed on the display 150 of the electronic device 101.

Hereinafter, various embodiments of the present disclosure will be described with reference to FIG. 7C.

Referring to FIG. 7C, the electronic device 101 may zoom-in/out the screen composition displayed on the display 150 of the electronic device 101 based on the detection information received from the wearable device 102 connected through network communication. According to an embodiment of the present disclosure, when acquiring the detection information, the wearable device 102 may acquire state information of the wearable device 102 and/or motion information of the wearable device 102 through the sensor module included in the wearable device 102. According to an embodiment of the present disclosure, the wearable device 102 may determine a 3D coordinate system set to the wearable device 102 through the sensor module. The wearable device 102 may detect a vector corresponding to the 3D coordinate system in a state where the wearable device 102 is moved to be farther from or closer to the user. The wearable device 102 may transmit detection information including the acquired vector to the electronic device 101. When the wearable device 102 transmits the detection information to the electronic device 101, the detection information may include the vector acquired through the sensor module and at least some pieces of information on the 3D coordinate system set to the wearable device 102, device identification information of the wearable device 102, and information related to the data acquired through the sensor module such as packet attributes of the acquired vector.

The electronic device 101 may determine control information of the electronic device 101 corresponding to the detection information received from the wearable device 102 based on the database included in the memory 130. According to an embodiment of the present disclosure, the wearable device 102 may acquire, from the detection information received by the electronic device 101, a vector corresponding to the detection of an operation for movement in a z axis direction (and/or −z axis direction) through the sensor module. The electronic device 101 may determine control information for making a control to zoom-in/out the screen composition displayed on the display 150 of the electronic device 101 in accordance with the vector in the z axis direction of the 3D coordinate system included in the detection information based on the database. The database which is a basis of the operation for determining the vector in the z axis direction of the 3D coordinate system included in the detection information as the control information for making a control to zoom-in/out the screen composition displayed on the display 150 of the electronic device 101 may be defined by previously tested information.

Figure 8:
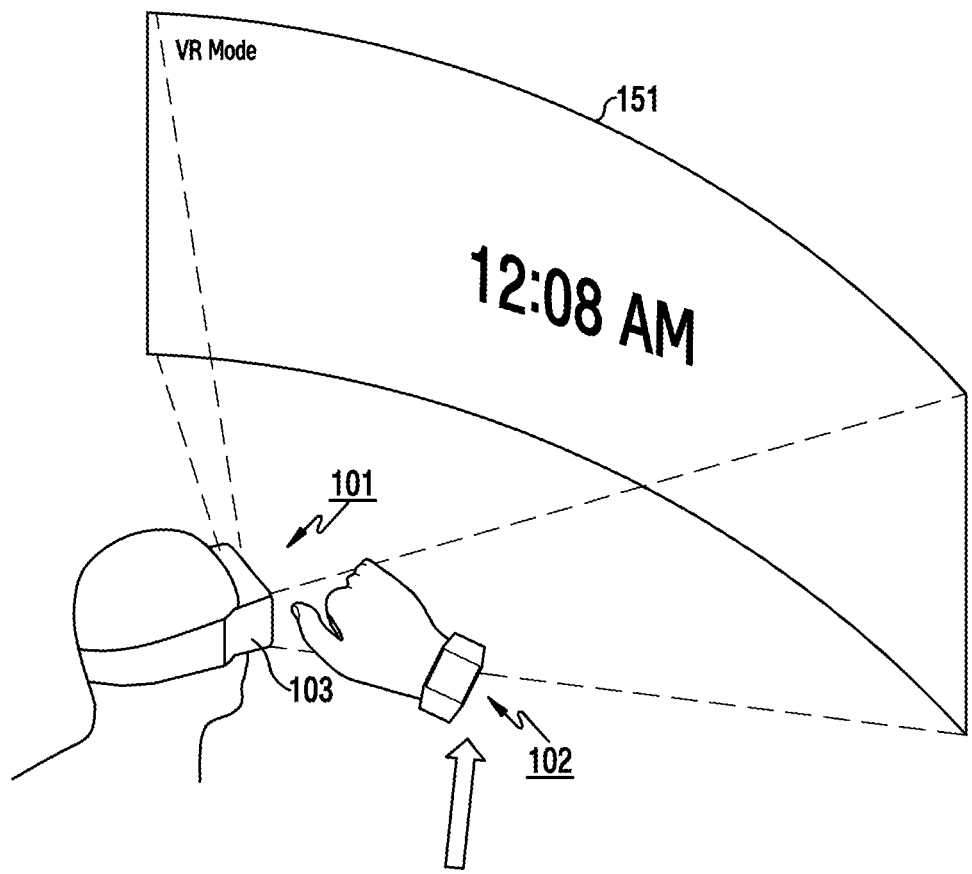
FIG. 8 illustrates various embodiments of controlling an electronic device based on data received from a wearable device according to various embodiments of the present disclosure.

FIG. 8 illustrates various embodiments of controlling the electronic device based on data received from the wearable device according to various embodiments of the present disclosure.

Referring to FIG. 8, the electronic device 101 may perform an operation of the wearable device 102 corresponding to a motion (for example, a gesture) of the wearable device 102 connected through network communication. According to an embodiment of the present disclosure, the wearable device 102 may be mounted on a user's body to detect a particular gesture by the user through the sensor module. The wearable device 102 may perform a predetermined operation of the wearable device 102 corresponding to the detected gesture. According to an embodiment of the present disclosure, the wearable device 102 may detect an operation for moving the wearable device 102 in a direction opposite to gravity, and a gesture for placing the display of the wearable 102 to face the direction opposite to the gravity immediately after the operation. The wearable device 102 may determine the operation corresponding to the detected gesture as an operation for displaying a time on the display of the wearable device 102.

The wearable device 102 may transmit control information for displaying the determined time to the electronic device 101. The electronic device 101 may display time information on the display 150 of the electronic device 101 based on the received control information. According to various embodiments of the present disclosure, the wearable device 102 may transmit, to the electronic device 101, detection information on the operation for moving the wearable device 102 in a direction opposite to the gravity acquired through the sensor module and the gesture for placing the display of the wearable 102 to face the direction opposite to the gravity immediately after the operation. The detection information transmitted by the wearable device 102 may include a vector of a motion of the electronic device 101 acquired through the sensor module based on the 3D coordinate system set to the wearable device 102. The electronic device 101 may determine control information for making a control to display the time information on the display 150 of the electronic device 101 in accordance with the vector acquired on the basis of the 3D coordinate system included in the detection information based on the database. The database which is a basis of the operation for determining the operation for moving the wearable device 102 in the direction opposite to the gravity and the gesture (for example, vector) for placing the display of the wearable device 102 to face the direction opposite to the gravity immediately after the operation as control information for making a control to display the time on the display 150 of the electronic device 101 may be defined by previously tested information.

Figure 9:
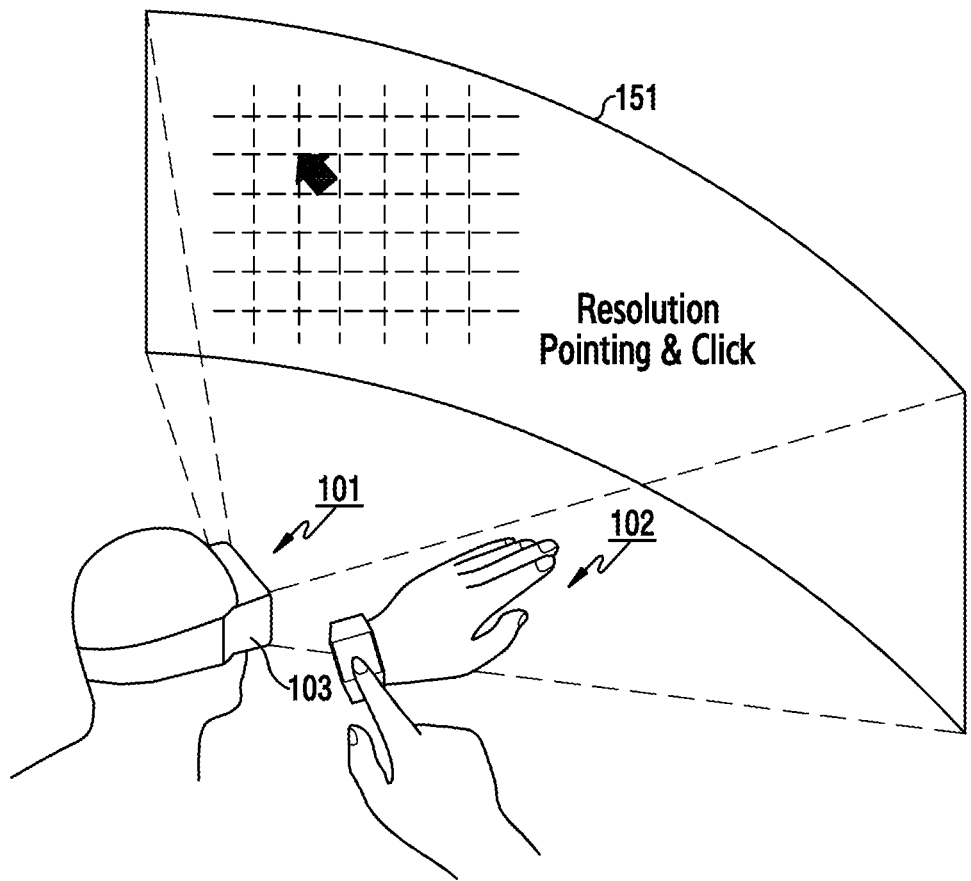
FIG. 9 illustrates various embodiments of controlling an electronic device based on data received from a wearable device according to various embodiments of the present disclosure.

FIG. 9 illustrates various embodiments of controlling the electronic device based on data received from the wearable device according to various embodiments of the present disclosure.

Referring to FIG. 9, the electronic device 101 may use the display (for example, a touch screen) of the wearable device 102 connected through network communication as a pointing device that points to a particular position of the display 150 of the electronic device 101. According to an embodiment of the present disclosure, the wearable device 102 may determine a position where a touch (for example, direct touch or indirect touch) input is detected on the display. The position of the touch input detected on the display of the wearable device 102 may be determined as a coordinate of the touch input detected in a particular position based on a 3D coordinate system (for example, a coordinate system including x and y axes) set to the display. The wearable device 102 may transmit the detected coordinate to the electronic device 101 as detection information. The electronic device 101 may make a control to display a pointing object (for example, a pointer) on the 3D screen 151 (for example, the 3D screen corresponding to the screen composition of the display 150 shown to the user through the lens 303 of the HMT device 103) provided to the user on the basis of the displaying on the display 150 of the electronic device 101 based on the received detection information.

According to an embodiment of the present disclosure, the display 150 of the electronic device 101 and the wearable device 102 may be configured in the same coordinate system (for example, a 2D coordinate system including x and y axes) or in different coordinate systems (the 3D screen 151 displayed based on the displaying on the display 150 of the electronic device 101 may be configured in a 2D coordinate system including x' and y' axes and the display of the wearable device 102 is configured in a 2D coordinate system including x and y axes). When the 3D screen 151 displayed based on the displaying on the display 150 of the electronic device 101 and the display of the wearable device 102 are configured in the same coordinate system, the electronic device 101 may make a control to display a pointer in a predetermined position of the 3D screen 151 displayed based on the displaying on the display 150 of the electronic device 101 corresponding to the coordinate included in the received detection information. When the 3D screen 151 displayed based on the displaying on the display 150 of the electronic device 101 and the display of the wearable device 102 are configured in different coordinate systems (for example, the 3D screen 151 displayed based on the displaying on the display 150 of the electronic device 101 may be configured in a 2D coordinate system including x' and y' axes and the display of the wearable device 102 is configured in a 2D coordinate system including x and y axes), the electronic device 101 may determine the coordinate (for example, a second coordinate) displayed based on the displaying on the display 150 corresponding to the coordinate (for example, a first coordinate) included in the detection information based on the database and make a control to display a pointer in a position of the determined coordinate (for example, the second coordinate) in the 3D screen 151 displayed based on the displaying on the display 150 of the electronic device 101. According to various embodiments of the present disclosure, when a coordinate of a touch input detected on the display (for example, a touch screen) of the wearable device 102 based on the detection information received from the wearable device 102 connected through network communication is changed, the electronic device 101 may make a control to display a pointer in a coordinate (for example, a fourth coordinate) of the 3D screen 151 displayed based on the displaying on the display 150 corresponding to a changed coordinate (for example, a third coordinate).

Figure 10A:
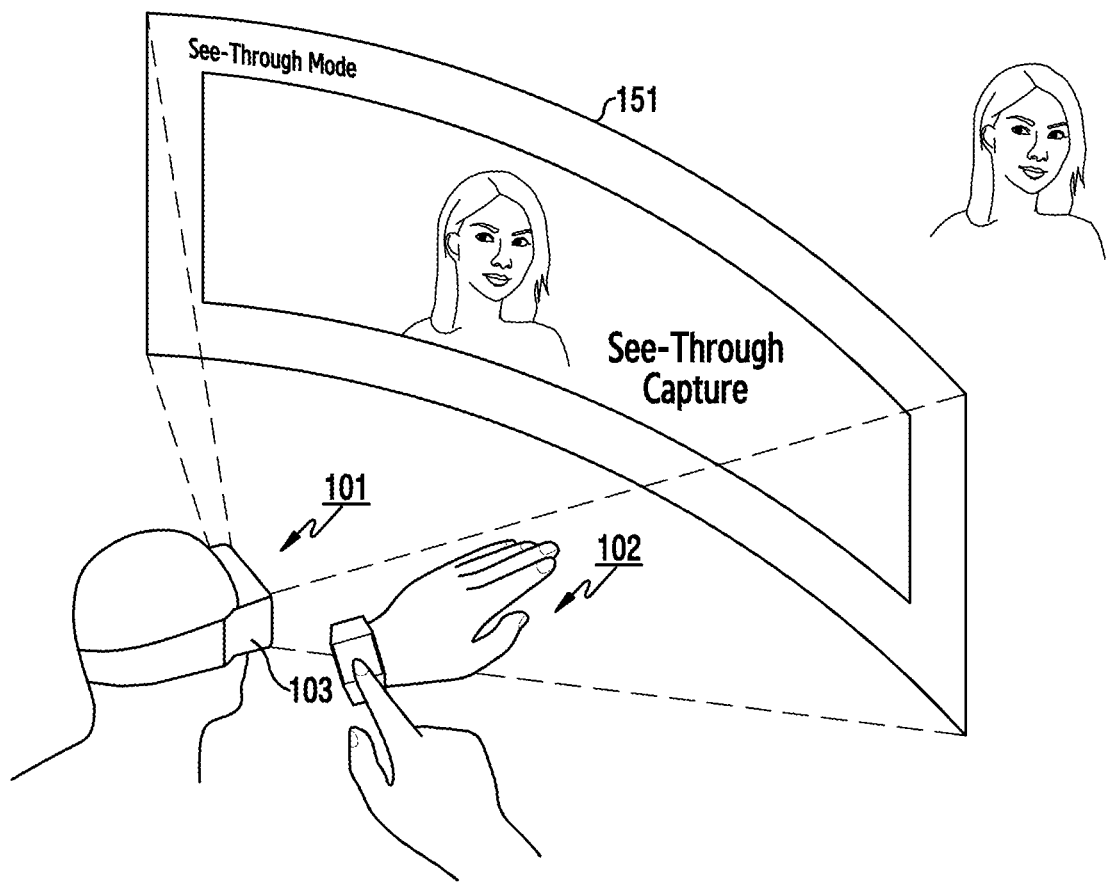
FIGS. 10A and 10B illustrate various embodiments of controlling an electronic device based on data received from another electronic device according to various embodiments of the present disclosure.
Figure 10B:
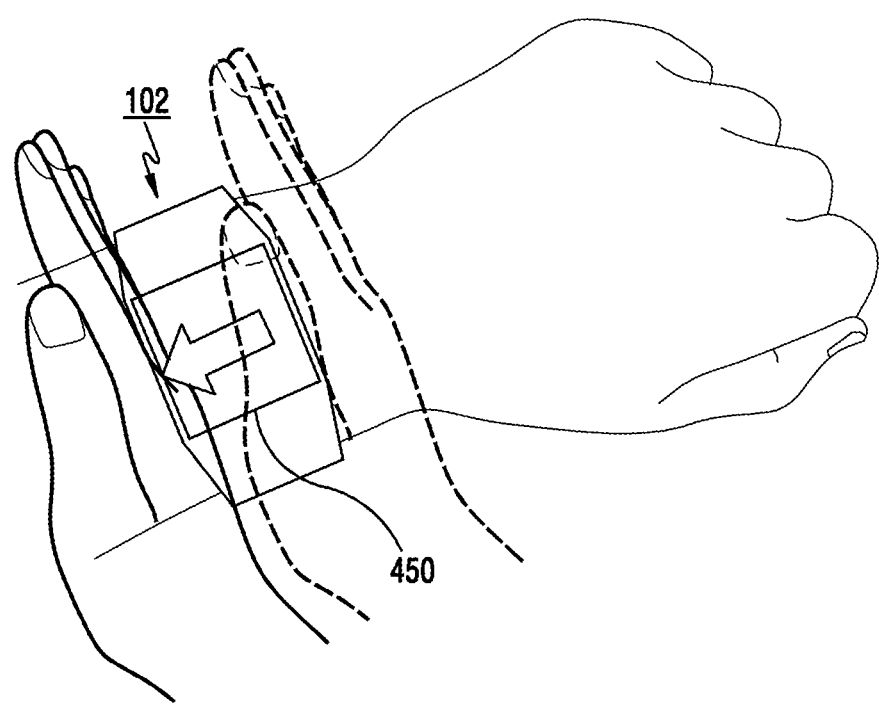

FIGS. 10A and 10B illustrate various embodiments of controlling the electronic device based on data received from another electronic device according to various embodiments of the present disclosure.

Hereinafter, various embodiments of the present disclosure will be described with reference to FIG. 10A.

Referring to FIG. 10A, the electronic device 101 may perform a function provided by the electronic device 101 based on input data or control information received through the wearable device 102 connected through network communication. According to an embodiment of the present disclosure, when the electronic device 101 executes a photographing mode (for example, a photographing mode in which a camera module of the electronic device 101 is used), the electronic device 101 may display an image acquired through the camera module of the electronic device 101 on the display 150. When the electronic device 101 detects a touch input in the display 150 or a particular position of the display of the wearable device 102 in the HMT mode, the electronic device 101 may display a photographing icon for photographing an image. The wearable device 102 may receive control information indicating the execution of the photographing mode by the electronic device in the HMT mode and transmit a touch input detected on the display of the wearable device 102 to the electronic device 101 as detection information. The electronic device 101 may process the touch input detected on the display of the wearable device 102 as an input for photographing an image in the photographing mode of the electronic device 101 based on the received detection information. Alternatively, the electronic device 101 may process the touch input detected on the display of the wearable device 102 as a touch of the photographing icon displayed on the display 150 of the electronic device 101 based on the received detection information.

Hereinafter, various embodiments of the present disclosure will be described with reference to FIG. 10B.

Referring to FIG. 10B, when the detection information received from the wearable device 102 connected through network communication in response to a predetermined operation performed when the electronic device 101 detects a particular input is identical or similar to the particular input, the electronic device 101 may perform the predetermined operation. According to an embodiment of the present disclosure, the electronic device 101 may provide a function of capturing an image displayed on the display 150 of the electronic device 101 in response to a touch input of touching a predetermined range area of a right edge area of the display 150 and dragging the touch in a left direction while maintaining the touch. When the detection information received from the wearable device 102 is control information corresponding to the touch input of touching the predetermined range area of the right edge area of the display 450 of the wearable device 102 and dragging the touch in the left direction while maintaining the touch, the electronic device 101 may perform an operation of capturing an image displayed on the display 150 of the electronic device 101. According to another embodiment of the present disclosure, when the detection information received from the wearable device 102 is control information corresponding to detection of a user's hand at a right edge area of the display 450 of the wearable device 102 and movement of the user's hand in the left direction, the electronic device 101 may perform an operation of capturing an image displayed on the display 150 of the electronic device 101.

Figure 11:
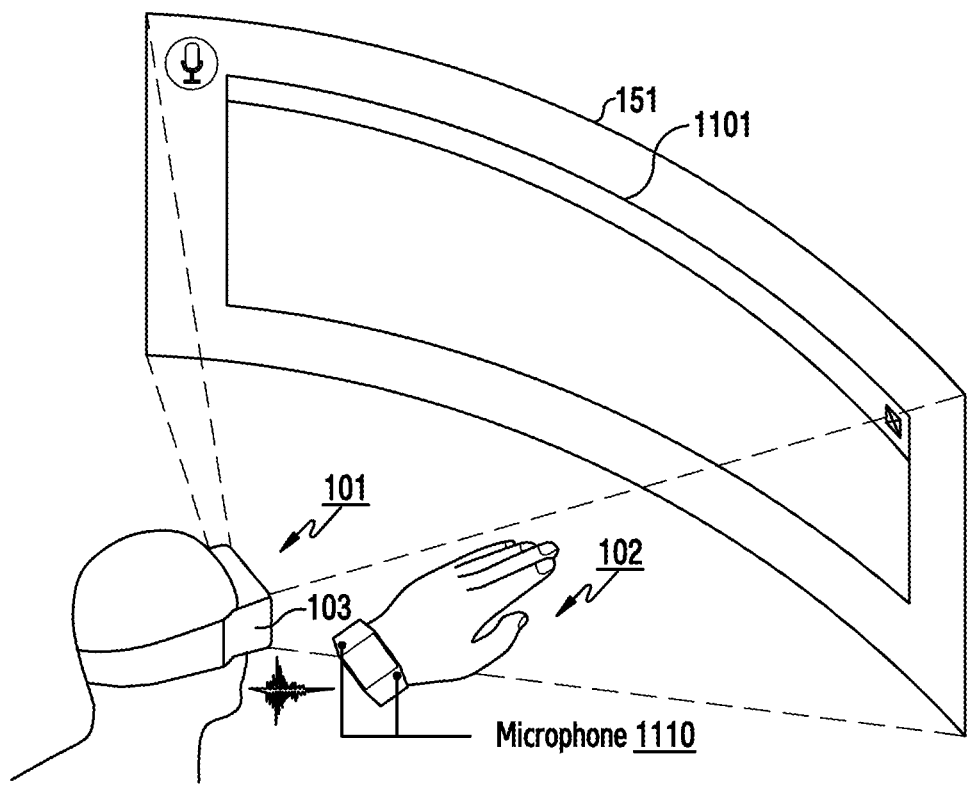
FIG. 11 illustrates various embodiments of controlling an electronic device based on data received from a wearable device according to various embodiments of the present disclosure.

FIG. 11 illustrates various embodiments of controlling the electronic device based on data received from the wearable device.

Referring to FIG. 11, when the detection information received from the wearable device 102 is control information input as a voice, the electronic device 101 may provide a function of the electronic device 101 corresponding to the voice. According to an embodiment of the present disclosure, the wearable device 102 may transmit a voice detected through a microphone 1110 to the electronic device 101, and the electronic device 101 may perform a function of the electronic device 101 corresponding to the received voice. For example, the wearable device 102 may transmit voice data "Internet" detected by the wearable device 102 to the electronic device 101 as detection information. The electronic device 101 may execute an Internet search application 1101 in response to the voice "Internet" of the detection information. According to various embodiments of the present disclosure, the wearable device 102 may determine a function provided by the electronic device 101 in response to a voice command detected through the microphone 1110 and transmit control information for controlling the determined function to the electronic device 101 as detection information. The electronic device 101 may perform the function determined by the wearable device 102 based on the received detection information. For example, an operation corresponding to the voice "Internet" detected by the wearable device 102 may be determined as an operation for executing the Internet search application of the wearable device 102. The wearable device 102 may transmit the control information for executing the Internet search application to the electronic device 101 as detection information. The electronic device 101 may execute the Internet search application according to the control information of the received detection information.

Figure 12:
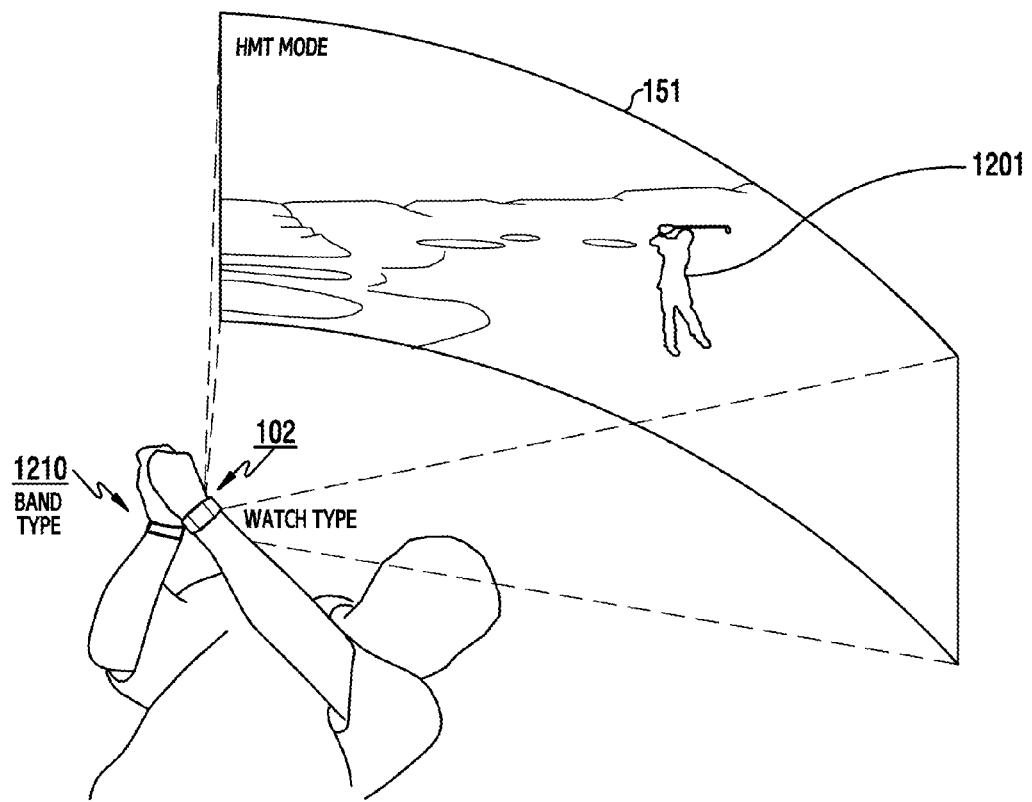
FIG. 12 illustrates various embodiments of controlling an electronic device based on data received from a wearable device according to various embodiments of the present disclosure.

FIG. 12 illustrates various embodiments of controlling the electronic device based on data received from the wearable device according to various embodiments of the present disclosure.

Referring to FIG. 12, an electronic device 104 may be a wearable device (hereinafter, referred to as a wearable device 1210) which can be worn on a user's body. The wearable device 1210 may be a device of the same type as the wearable device 102 or a device of a similar type to the wearable device 102, and may have configurations identical or similar to those of the wearable device 102 or the electronic device 101.

The electronic device 101 may be connected to two or more wearable devices (for example, the wearable device 102 and the wearable device 1210) through network communication. The electronic device 101 may receive detection information from two or more connected electronic devices and perform an operation of the electronic device 101 corresponding to the received detection information. According to an embodiment of the present disclosure, the electronic device 101 may perform a simulation (for example, a golf simulation) in the HMT mode. The electronic device 101 may receive detection information (for example, first detection information of the wearable device 102 and second detection information of the wearable device 1210) from each of the two or more electronic devices (for example, the wearable device 102 and the wearable device 1210) connected through network communication. For example, referring to FIG. 12, the user may play a golf simulation while wearing the wearable device 102 (for example, a smart watch) on a left wrist of the user and the wearable device 1210 (for example, a smart band) on a right wrist of the user. When the user makes a golf swing action, a sensor module of the wearable device 102 and a sensor module of the wearable device 1210 may detect sensing information corresponding to the swing action of the user. The wearable device 102 and the wearable device 1210 may transmit the acquired sensing information to the electronic device 101 as detection information. The electronic device 101 may determine a predetermined action (for example, a swing action) of the golf simulation corresponding to the received detection information (for example, the first detection information received from the wearable device 102 and/or the second detection information received from the wearable device 1210) based on a database, and may perform and display the swing action 1201 in the golf simulation of the 3D screen 151 displayed based on the display 150 of the electronic device 101.

Figure 13:
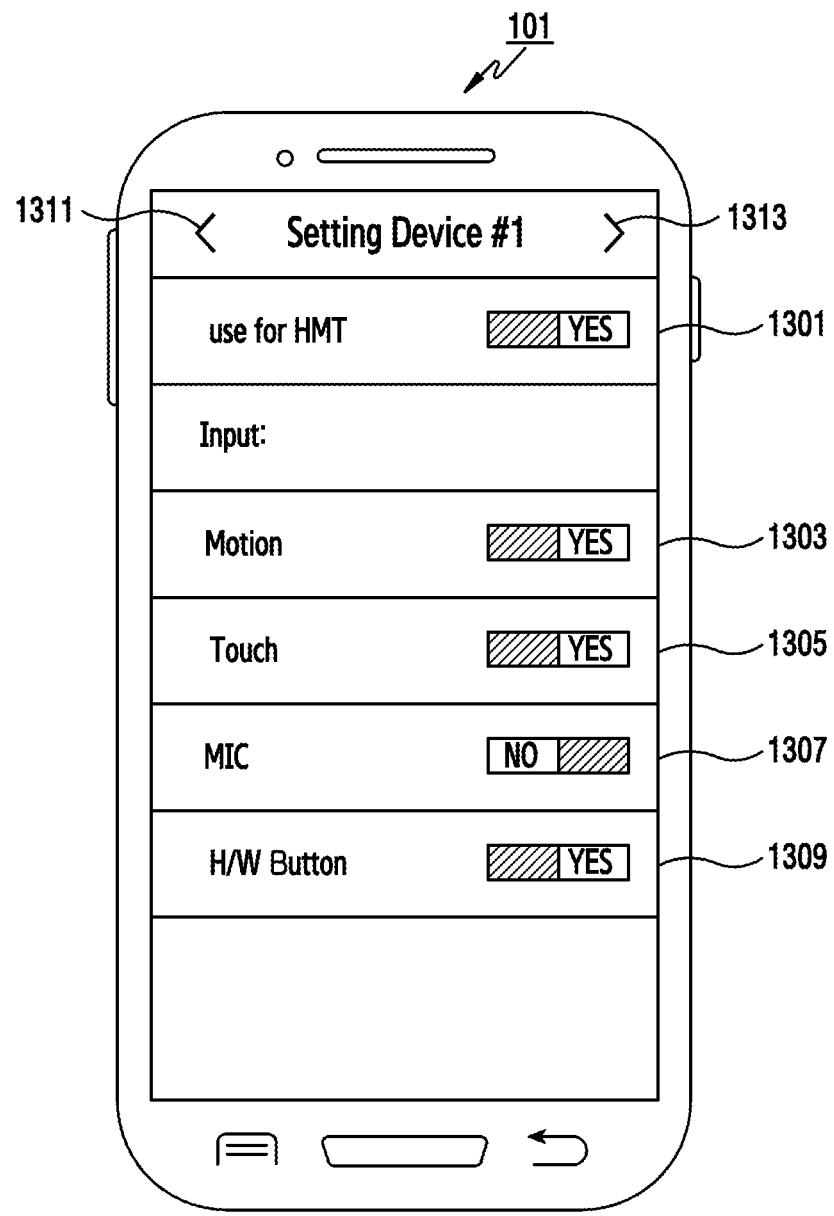
FIG. 13 illustrates an operation in which an electronic device implementing various embodiments configures one or more wearable devices to execute an HMT mode according to various embodiments of the present disclosure.

FIG. 13 illustrates an operation in which an electronic device implementing various embodiments configures one or more wearable devices to execute the HMT mode according to various embodiments of the present disclosure.

Referring to FIG. 13, when the HMT mode is executed, the electronic device 101 may insert setting information of the designated wearable device 102, which is connected through network communication to receive detection information for controlling the electronic device 101 into the database. According to an embodiment of the present disclosure, the electronic device 101 may determine one or more electronic devices to be used as input devices for controlling a function of the electronic device 101 in the HMT mode among the wearable devices connected to the electronic device 101 through the setting information.

According to an embodiment of the present disclosure, referring to reference numeral 1301 of FIG. 13, the electronic device 101 may provide a menu in the setting information for turning on/off the HMT mode to determine whether to use, in the HMT mode, a particular electronic device among the electronic devices connected to the electronic device 101 through network communication.

When it is determined that the selected particular electronic device (for example, the wearable device 102) is used as the input device of the HMT mode, the electronic device 101 may provide a menu for determining an input designated to control a function of the electronic device 101 among inputs detected by the wearable device 102. According to an embodiment of the present disclosure, the electronic device 101 may provide at least one of a menu 1303 for determining whether to use a motion detected through the sensor module of the wearable device 102 as control information for controlling a function of the electronic device 101, a menu 1305 for determining whether to use a touch input detected on the touch screen of the wearable device 102 as control information for controlling a function of the electronic device 101, a menu 1307 for determining whether to use audio data detected by the microphone of the wearable device 102 as control information for controlling a function of the electronic device 101, and a menu 1309 for determining whether to use an input detected through a button of the wearable device 102 as control information for controlling a function of the electronic device 101. The electronic device 101 may provide a menu for setting each piece of setting information of at least one wearable device (for example, the wearable device 102 or the wearable device 104) connected through network communication. According to an embodiment of the present disclosure, when providing an HMT mode setting function, the electronic device 101 may provide a setting menu of one or more wearable devices and may call a setting menu of a wearable device to be set through a predetermined method such as an operation of selecting an object (for example, a previous device 1311 and a next device 1313) displayed on the display 150.

The electronic device 101 may transmit setting information to a corresponding particular electronic device (for example, the wearable device 102) and receive, from one or more wearable devices, setting information indicating whether each of the electronic devices operates with the electronic device 101 in the HMT mode. The electronic device 101 may store one or more pieces of setting information in the database.

Figure 14:
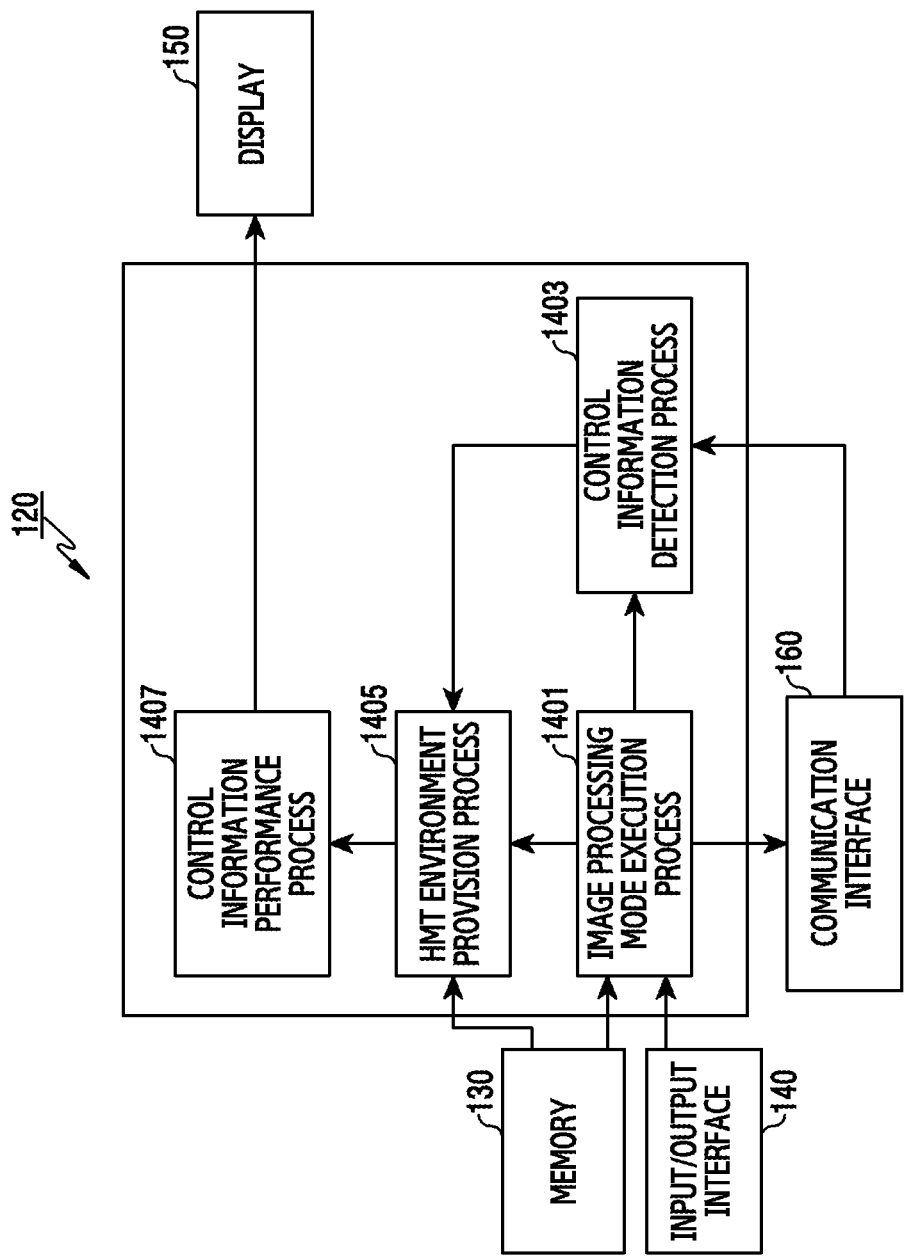
FIG. 14 illustrates an operation of a processor in an electronic device implementing various embodiments according to various embodiments of the present disclosure.

FIG. 14 illustrates an operation of a processor in the electronic device implementing various embodiments according to various embodiments of the present disclosure.

As described above, various embodiments of the present disclosure performed by the electronic device 101 may be performed through a processor 120. Referring to FIG. 14, in various embodiments of the present disclosure performed by the processor 120, operations (for example, processes) of the processor 120 may be divided to clearly describe the operations. The processor 120 of the electronic device 101 may include at least one of the operations for performing various embodiments of the present disclosure such as an HMT mode execution process 1401, a control information detection process 1403, an HMT environment provision process 1405, and a control information performance process 1407.

The HMT mode execution process 1401 may detect an input for executing the HMT mode of the electronic device 101 through the input/output interface 140. When the electronic device 101 enters the HMT mode, the electronic device 101 may transmit information (for example, control information) on the operation of the electronic device 101 in the HMT mode to one or more electronic devices among wearable devices connected through the network 162. The control information transmitted by the HMT mode execution process 1401 may be determined based on the database included in the memory 130 of the electronic device 101. The HMT mode execution process 1401 may transmit control information for making a request for performing a predetermined function to a particular electronic device connected through network communication. According to an embodiment of the present disclosure, the electronic device 101 may transmit control information for making a request for transmitting data acquired through the sensor module to the wearable device 102 as detection information. During the HMT mode execution process 1401, the electronic device 101 may transmit/receive data to/from the wearable device 102 through the communication interface 160.

The control information detection process 1403 may receive detection information from the wearable device 102 in the HMT mode state through the communication interface 160 in the HMT mode. The detection information may be an input detected by the wearable device 102 in the HMT mode state. According to an embodiment of the present disclosure, the detection information may be a touch input detected on the display (for example, a touch screen) of the wearable device 102. According to an embodiment of the present disclosure, the detection information may be motion data of the wearable device 102 detected through the sensor module of the wearable device 102. The control information detection process 1403 may detect control information in the received input data and process the control information through the HMT environment provision process 1405.

The HMT environment provision process 1405 may control the electronic device 101 according to an environment setting designated to display a display interface corresponding to the operation performed by the electronic device on the display 150 in the HMT mode. According to an embodiment of the present disclosure, the electronic device 101 may control a resolution of the display 150 of the electronic device 101 for the 3D screen 151 provided to the user through the HMT device 103 by interworking with the database and/or the HMT device 103. The HMT environment provision process 1405 may provide data related to screen composition displayed on the display 150 of the electronic device 101 to the HMT device 103.

The HMT environment provision process 1405 may determine a control operation of the electronic device 101 corresponding to control information of the detection information received from the wearable device. The HMT environment provision process 1405 may determine one or more operations to be controlled by the electronic device 101 in accordance with the control information detected by the control information detection process 1403 based on the database included in the memory 130 of the electronic device 101. According to an embodiment of the present disclosure, the control information of the detection information received from the wearable device 102 may be a vector acquired through the sensor module based on a 3D coordinate system set to the wearable device 102, and the electronic device 101 may control a display interface (for example, left/right swipe, up/down scroll, or zoom-in/zoom-out) of the electronic device 101 provided to the user through the HMT device 103 based on the acquired vector.

The control information performance process 1407 may control the electronic device 101 according to the control information received from the wearable device 102. When the electronic device 101 is controlled according to the control information, the control information performance process 1407 may display a control state on the display 150 and output the control state of the electronic device 101 through an image output device. According to an embodiment of the present disclosure, the control information of the detection information received from the wearable device 102 may be a vector acquired through the sensor module based on a 3D coordinate system set to the wearable device 102, and the electronic device 101 may control a display interface (for example, left/right swipe, up/down scroll, or zoom-in/zoom-out) of the electronic device 101 provided to the user through the HMT device 103 based on the acquired vector. The electronic device 101 may display a state, in which the display interface is controlled, on the display 150 of the electronic device 101 controlled based on the vector and provide the user with the state, in which the display interface displayed on the display 150 of the electronic device 101, through the HMT device 103. Further, when the HMT device 103 includes a separate output unit (for example, a display or an image output device) for outputting screen composition displayed on the display 150 of the electronic device 101, the electronic device 101 may transmit, to the HMT device, the screen composition displayed on the display 150 of the electronic device 101 to the HMT device 103 through a communication scheme (for example, USB communication) for the connection with the HMT device 103, and may output a state, in which the display interface of the electronic device 101 is controlled, through the output unit of the HMT device 103.

The operation of the processor 120 described above may be performed by a separate HMT processing module 170 included in the electronic device 101 to perform various embodiments of the present disclosure.

According to various embodiments of the present disclosure, the processor 120 may be connected to the HMT device to switch to the HMT mode, make a control to transmit HMT mode change request information to at least one wearable device, make a control to receive detection information from the wearable device, and perform a function of the electronic device corresponding to the detection information.

According to various embodiments of the present disclosure, the processor 120 may display the performed function on the display of the electronic device based on the HMT mode. According to various embodiments of the present disclosure, the processor 120 may change and display screen composition of the display such that the HMT device may provide a 3D screen. According to various embodiments of the present disclosure, the processor 120 may acquire sensing information detected through at least one of an acceleration sensor, gravity sensor, gyro sensor, tilt sensor, illumination sensor, and biometric sensor of the wearable device operating in the HMT mode based on the detection information. According to various embodiments of the present disclosure, the processor 120 may control the display interface based on the detection information. According to various embodiments of the present disclosure, the processor 120 may control the interface by performing at least one of movement, zoom-in, and zoom-out in the space displayed on the display, scroll of a page displayed on the display, and control of an object displayed on the display. According to various embodiments of the present disclosure, the processor 120 may perform the function of the wearable device corresponding to the detection information in the electronic device. According to various embodiments of the present disclosure, the processor 120 may acquire a touch input detected by a touch screen of the wearable device based on the detection information. According to various embodiments of the present disclosure, the processor may determine a second coordinate of the display of the electronic device corresponding to a first coordinate detected by the touch screen of the wearable device and output an operation of displaying a pointing object in the second coordinate through a third electronic device. According to various embodiments of the present disclosure, the processor 120 may receive second detection information from a second wearable device functionally connected to the electronic device and perform functions of the electronic device corresponding to the detection information and the second detection information.

Figure 15:
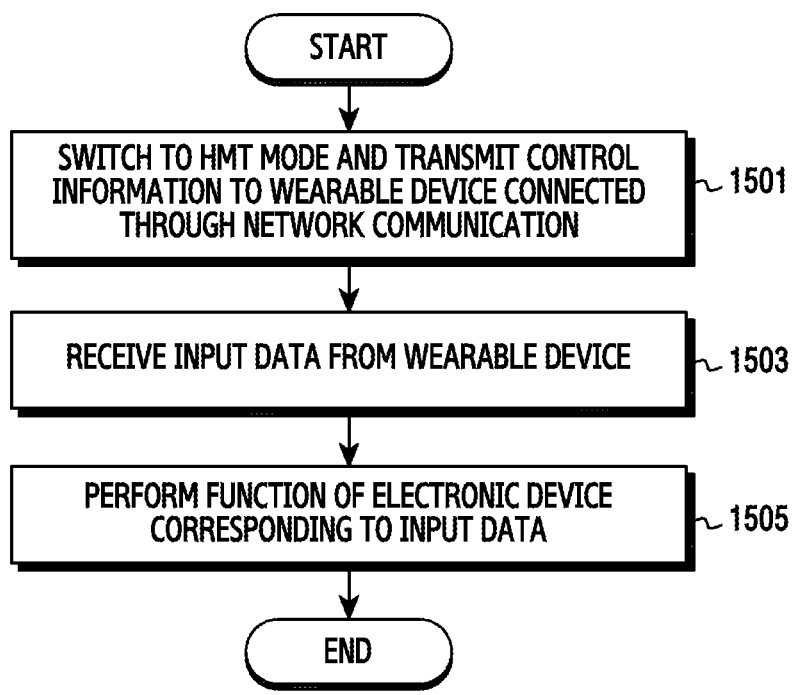
FIG. 15 is a flowchart illustrating an operation in an HMT mode of an electronic device implementing various embodiments according to various embodiments of the present disclosure.

FIG. 15 is a flowchart illustrating an operation in an HMT mode of the electronic device implementing various embodiments according to various embodiments of the present disclosure.

Referring to FIG. 15, when the electronic device 101 detects execution of the HMT mode, the electronic device 101 may operate in (or switch to) the HMT mode and transmit mode change information on the operation of the electronic device 101 in the HMT mode to one or more wearable devices 102 connected to the electronic device through network communication in operation 1501. According to an embodiment of the present disclosure, the electronic device 101 may designate operations specific to the one or more wearable devices connected to the electronic device 101 operating in the HMT mode based on the database and transmit mode change information to the wearable devices, and the wearable devices receiving the mode change information may operate in the HMT mode based on the received mode change information. Alternatively, the electronic device 101 may transmit mode change information for making a control to operate, in the HMT mode, one or more wearable devices connected to the electronic device operating in the HMT mode to the wearable devices based on the database and the wearable devices receiving the mode change information may operate in the HMT mode based on setting information of the wearable devices.

In operation 1503, the electronic device 101 may receive detection information from the wearable device 102 connected through network communication. The electronic device 101 may determine control information for controlling a function of the electronic device 101 from the received detection information. According to an embodiment of the present disclosure, the control information of the detection information may be sensing information acquired through the sensor module of the electronic device 101, and an operation of controlling the function of the electronic device according to the sensing information may be an operation of controlling a display interface output through the display 150 of the electronic device 101.

In operation 1505, the electronic device 101 may control the function of the electronic device 101 according to the control information of the received detection information. The electronic device 101 may control the display interface output through the HMT device 103 based on the control information of the detection information. According to an embodiment of the present disclosure, the electronic device 101 may control an operation such as switching, swipe, scroll, zoom-in/zoom-out of the display interface output through the HMT device 103, perform an operation corresponding to control information input into the electronic device transmitting detection information (for example, an operation of outputting time information), and combine pieces of detection information received from two or more electronic devices (for example, the wearable device 102 and the wearable device 104) to perform a corresponding operation (for example, a user's action in a simulation). The electronic device 101 may output an operation performed based on detection information to the display 150 through a display interface of the HMT mode.

Further, the electronic device 101 may provide the user with an image displayed on the display 150 of the electronic device 101 through a lens (for example, the lens 303 of FIG. 3) included in the HMT device 103 or a display or image output device included in the HMT device 103 based on the control information of the received detection information.

The electronic device 101 may end the embodiment of FIG. 15 after performing operation 1505.

Figure 16:
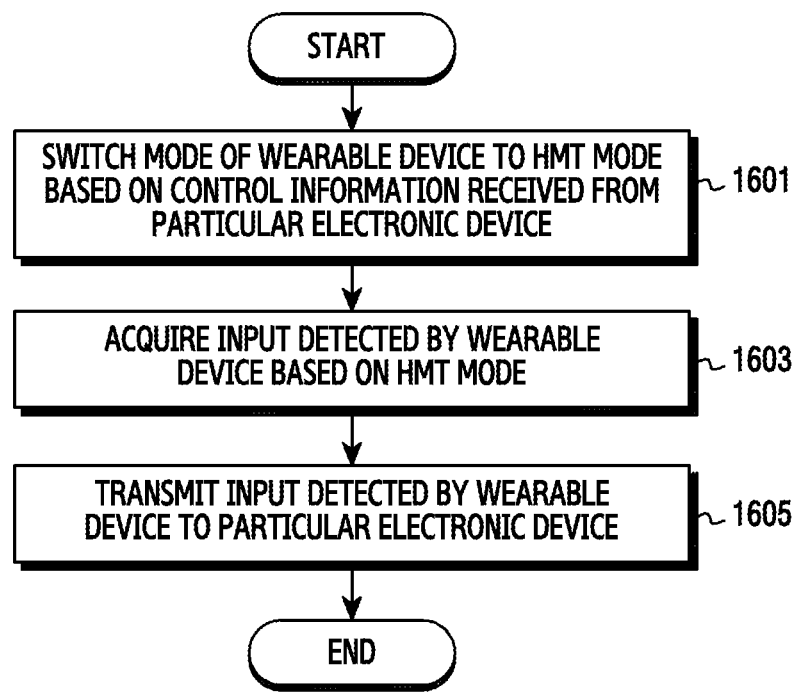
FIG. 16 is a flowchart illustrating an operation in an HMT mode of a wearable device implementing various embodiments according to various embodiments of the present disclosure.

FIG. 16 is a flowchart illustrating an operation in an HMT mode of the wearable device implementing various embodiments of the present disclosure.

Referring to FIG. 16, the wearable device 102 may receive mode change information on execution of the HMT mode by the electronic device 101 from a particular electronic device (for example, the electronic device 101). The wearable device 102 may make a setting such that wearable device 102 operates in the HMT mode based on the received mode change information in operation 1601. According to an embodiment of the present disclosure, the wearable device 102 may turn on/off one or more sensors designated to mode change information among various sensors included in the wearable device 102 based on the mode change information received from the electronic device 101. Alternatively, when receiving the mode change information, the wearable device 102 may turn on/off one or more sensors according to setting information.

In operation 1603, the wearable device 102 may acquire an input detected through one or more sensors in an on state. According to an embodiment of the present disclosure, the wearable device 102 may acquire values of inputs detected by predetermined sensors among sensors which may detect a state change of the wearable device 102 such as an acceleration sensor, a gyro sensor, a gesture sensor, and a geomagnetic sensor. The predetermined sensor may be a sensor in an on state in the HMT mode switched based on mode change information which the wearable device 102 receives from the electronic device 101 or setting information of the wearable device 102.

In operation 1605, the wearable device 102 may generate detection information according to a data configuration scheme appointed with a particular electronic device without processing inputs detected by predetermined units (for example, a sensor module and a microphone) in the HMT mode. The wearable device 102 may transmit the detection information to the electronic device 101.

The wearable device 102 may end the embodiment of FIG. 16 after performing operation 1605.

Figure 17:
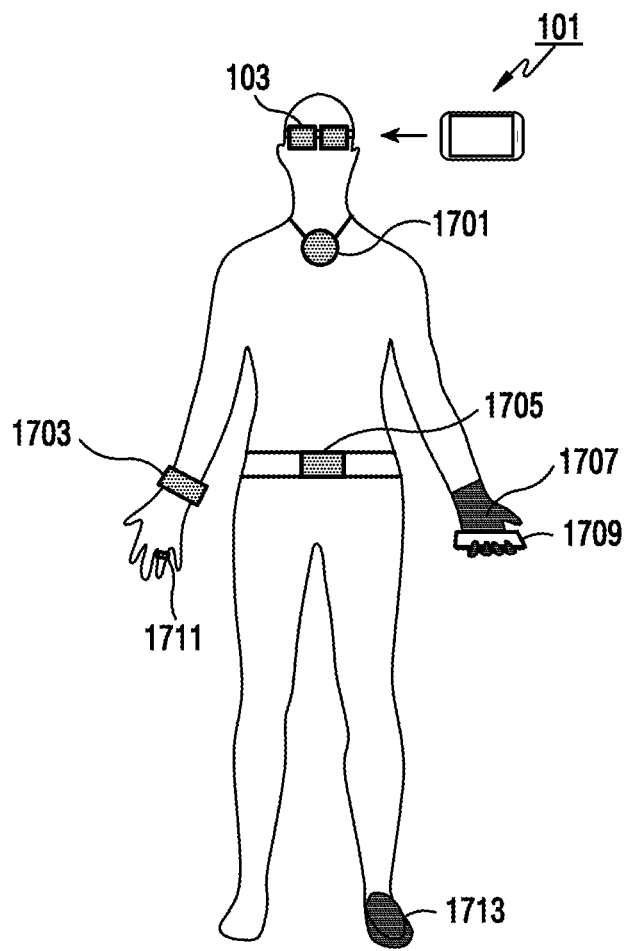
FIG. 17 illustrates a wearable device executing an HMT mode based on mode change information of an electronic device according to various embodiments of the present disclosure.

FIG. 17 illustrates a wearable device executing an HMT mode based on mode change information of the electronic device according to various embodiments of the present disclosure.

According to the above description, although the wearable device 102 or the wearable device 104 is described as a device which is worn on a wrist such as a smart watch or a smart band, the wearable device is not limited thereto and may include various devices which may be worn on a predetermined body position. Referring to FIG. 17, the wearable device 102 or the wearable device 104 (hereinafter, referred to a wearable device) may be provided in various forms of device such as a necklace 1701, a belt 1705, a glove 1707 a joystick 1709 grasped by a hand, a ring 1711, and a shoe 1713 as well as the above described watch or band 1703. According to an embodiment of the present disclosure, the wearable device 1707 of a glove type may include a tactile sensor and transmit information on contact by a hand covered with the glove to the electronic device 101. According to an embodiment of the present disclosure, the wearable device 1713 of a shoe type may include a pressure sensor and transmit information corresponding to a stepping of the user to the electronic device 101. Further, it is obvious that the HMT device 103 also includes one or more sensors and transmits information detected in a state where the HMT device is worn to the electronic device 101.

Various embodiments for describing the present disclosure may be performed by at least one of one or more programs included in the memory of the electronic device 101, one or more processors (for example, the processor 120), and a module performing operations corresponding to various embodiments of the present disclosure. According to an embodiment of the present disclosure, the electronic device 101 may include a computer-readable storage medium (for example, the memory 130) having a program stored therein to process an operation for making a connection to the HMT device and switching to the HMT mode, an operation for transmitting HMT mode change request information to one or more wearable devices, an operation for receiving detection information from the wearable device, and an operation for performing a function of the electronic device corresponding to the detection information.

According to various embodiments of the present disclosure, through a wearable device (for example, a smart watch) connected to an electronic device (for example, a smart phone) through at least one of wired and wireless networks, limitations on a user input generated when the electronic device is placed in front of a user's eyes to be used in an HMT mode can be removed and battery power of the wearable device can be prevented from being consumed due to an unnecessary operation.

According to various embodiments of the present disclosure, at least some of the devices or methods according to various embodiments of the present disclosure as defined by the appended claims and/or disclosed herein may be implemented in the form of hardware, software, firmware, or any combination (e.g., module or unit) of at least two of hardware, software, and firmware. The module may be the smallest unit of an integrated component or a part thereof and may also be the smallest unit that performs various embodiments of the present disclosure or a part thereof. The "module" may be mechanically or electronically implemented. If implemented in software, a computer-readable storage medium (or storage medium readable by a computer) storing at least one program (or programming module) may be provided. The software may, for example, be implemented by instructions stored in a computer-readable storage medium in the form of a programming module. The at least one program may include instructions that cause the electronic device to perform the methods according to various embodiments of the present disclosure as defined by the appended claims and/or disclosed herein. When the command is executed by one or more processors (for example, the processor 220), the one or more processors may execute a function corresponding to the command. The computer-readable storage medium may be, for example, the memory 230. At least a part of the programming module may be implemented (for example, executed) by, for example, the processor 220. At least a part of the programming module may include, for example, a module, a program, a routine, a set of instructions and/or a process for performing one or more functions.

The computer-readable storage medium may include magnetic media such as a hard disc, a floppy disc, and a magnetic tape, optical media such as a compact disc ROM (CD-ROM) and a DVD, magneto-optical media such as a floptical disk, a hardware device specifically configured to store and execute program instructions (e.g., programming module), such as a ROM, a RAM, and a flash memory, an EEPROM, a magnetic disc storage device, any other type of optical storage device, and a magnetic cassette. Alternatively, any combination of some or all of the may form a memory in which the program is stored. Further, a plurality of such memories may be included in the electronic device.

In addition, the program may be stored in an attachable storage device capable of accessing the electronic device through a communication network such as the Internet, an intranet, a local area network (LAN), a wide LAN (WLAN), a storage area network (SAN), or any combination thereof. Such a storage device may access the electronic device via an external port. Further, a separate storage device on the communication network may access a portable electronic device. Any of the hardware devices as described above may be configured to work as one or more software modules in order to perform the operations according to various embodiments of the present disclosure, and vice versa.

Any of the modules or programming modules according to various embodiments of the present disclosure may include at least one of the above described elements, exclude some of the elements, or further include other additional elements. The operations performed by the modules, programming module, or other elements according to various embodiments of the present disclosure may be executed in a sequential, parallel, repetitive, or heuristic manner. Further, some operations may be executed according to another order or may be omitted, or other operations may be added.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of operating an electronic device, the method comprising: setting, by a first user input, the electronic device to cause to turn on or turn off at least one sensor of a wearable device when the electronic device is switched to a head mounted mode, the at least one sensor of the wearable device to control the electronic device by detecting a second user input at the wearable device;
   in response to detecting that the electronic device is mounted on a head mounted device, controlling the electronic device to switch to the head mounted mode;
   in response to the electronic device switching to the head mounted mode, displaying content on a display of the electronic device and transmitting a request to the wearable device to turn on or turn off the at least one sensor of the wearable device;
   receiving, from the wearable device, information regarding a gesture of the wearable device or the second user input at the wearable device obtained by using the at least one sensor of the wearable device;
   and changing a representation of the content being displayed on the display of the electronic device based on the information regarding the gesture of the wearable device or the second user input at the wearable device.

2. The method of claim 1, wherein the content comprises a left image on a left portion of the display and a right image on a right portion of the display.

3. The method of claim 2, wherein the displaying of the content comprises changing a screen composition of the display such that the head mounted device provides a three-dimensional (3D) screen.

4. The method of claim 1, wherein the changing of the representation of the content comprises performing at least one of moving, zooming-in and zooming-out of a space displayed on the display, scrolling a page displayed on the display, or controlling an object displayed on the display.

5. The method of claim 1, further comprising:
   determining a second coordinate of the display of the electronic device corresponding to a first coordinate detected from a touch screen of the wearable device; and
   outputting an operation for displaying a pointing object on the second coordinate through the electronic device.

6. The method of claim 1, wherein a touch panel of the wearable device is maintained as an active state.

7. The method of claim 6, further comprising:
   receiving information regarding a touch input on the touch panel from the wearable device; and
   moving a cursor of the content based on the information regarding the touch input.

8. An electronic device comprising: a communication circuit configured to communicate with a wearable device; a display; and one or more processors configured to: set, by a first user input, the electronic device to cause to turn on or turn off at least one sensor of the wearable device when the electronic device is switched to a head mounted mode, the at least one sensor of the wearable device to control the electronic device by detecting a second user input at the wearable device, in response to detecting that the electronic device is mounted on a head mounted device, control the electronic device to switch to the head mounted mode,
   in response to switching to the head mounted mode, control the display to display content and control the communication circuit to transmit a request to the wearable device to turn on or turn off the at least one sensor of the wearable device,
   receive, from the wearable device receiving the request, information regarding a gesture of the wearable device or the second user input at the wearable device obtained by using the at least one sensor of the wearable device,
   and change a representation of the content being displayed on the display of the electronic device based on the information regarding the gesture of the wearable device or the second user input at the wearable device.

9. The electronic device of claim 8, wherein the content comprises a left image on a left portion of the display and a right image on a right portion of the display.

10. The electronic device of claim 9, wherein the one or more processors is further configured to change and display a screen composition of the display such that the head mounted device provides a three-dimensional (3D) screen.

11. The electronic device of claim 8, wherein the one or more processors is further configured to control an interface of the display by performing at least one of moving, zooming-in and zooming-out of a space displayed on the display, scrolling a page displayed on the display, or controlling an object displayed on the display.

12. The electronic device of claim 8, wherein the one or more processors is further configured to:

determine a second coordinate of the display of the electronic device corresponding to a first coordinate detected from a touch screen of the wearable device, and output an operation for displaying a pointing object on the second coordinate through the electronic device.

13. The electronic device of claim 8, wherein a touch panel of the wearable device is maintained as an active state.

14. The electronic device of claim 13, wherein the one or more processors is further configured to:

receive information regarding a touch input on the touch panel from the wearable device; and move a cursor of the content based on the information regarding the touch input.

* * * * *